US012243375B2

(12) United States Patent
Winston et al.

(10) Patent No.: US 12,243,375 B2
(45) **Date of Patent: *Mar. 4, 2025**

(54) GAMING SIGNAGE INCLUDING ONE OR MORE MOVABLE DISPLAY MONITORS

(71) Applicant: Aristocrat Technologies Australia Pty Ltd., North Ryde (AU)

(72) Inventors: Eric P. Winston, Reno, NV (US); Timothy William Seckel, Streamwood, IL (US)

(73) Assignee: Aristocrat Technologies Australia Pty Limited, North Ryde (AU)

( * ) Notice: Subject to any disclaimer, the term of this patent is extended or adjusted under 35 U.S.C. 154(b) by 0 days.

This patent is subject to a terminal disclaimer.

(21) Appl. No.: 18/438,309

(22) Filed: Feb. 9, 2024

(65) Prior Publication Data

US 2024/0185670 A1 Jun. 6, 2024

Related U.S. Application Data

(63) Continuation of application No. 18/067,463, filed on Dec. 16, 2022, now Pat. No. 11,935,355, which is a (Continued)

(51) Int. Cl.
*G07F 17/32* (2006.01)
*G06Q 50/34* (2012.01)
*G07F 17/34* (2006.01)

(52) U.S. Cl.
CPC ......... *G07F 17/3213* (2013.01); *G06Q 50/34* (2013.01); *G07F 17/3216* (2013.01); (Continued)

(58) Field of Classification Search
CPC ............. G07F 17/3211; G07F 17/3216; G07F 17/3227; G07F 17/3267; G07F 17/3269
See application file for complete search history.

(56) References Cited

U.S. PATENT DOCUMENTS 6,532,146 B1 3/2003 Duquette
7,775,888 B2 8/2010 Wudtke
(Continued)

OTHER PUBLICATIONS

U.S. Final Office Action dated Sep. 20, 2019 in U.S. Appl. No. 16/009,043.
(Continued)

*Primary Examiner* — Justin L Myhr
(74) *Attorney, Agent, or Firm* — Weaver Austin Villeneuve & Sampson LLP

(57) ABSTRACT

A gaming signage system may include one or more movable displays. One or more movable displays may present first visual effects while the one or more movable displays are in a first configuration in which at least one game feature presentation device is not viewable. In response to a trigger event indication (which may correspond to a base game event), the movable display(s) may move to a second configuration and reveal the game feature presentation device. The game feature presentation device may be used to present a bonus feature and/or to present a different aspect of the base game. Alternatively, at least a portion of a movable display may be hidden when in a first configuration. At least the portion of the movable display(s) may present a bonus feature and/or a different aspect of the base game when in the second configuration.

20 Claims, 22 Drawing Sheets

Related U.S. Application Data continuation of application No. 17/453,140, filed on Nov. 1, 2021, now Pat. No. 11,532,202, which is a continuation of application No. 16/849,505, filed on Apr. 15, 2020, now Pat. No. 11,183,005, which is a continuation of application No. 16/151,197, filed on Oct. 3, 2018, now Pat. No. 10,636,244.

(52) U.S. Cl.
CPC ...... *G07F 17/3223* (2013.01); *G07F 17/3267* (2013.01); *G07F 17/34* (2013.01)

(56) References Cited

U.S. PATENT DOCUMENTS

| | | | |
|---|---|---|---|
| 7,780,534 | B2 | 8/2010 | Wudtke |
| 7,905,783 | B2 | 3/2011 | Cole |
| 8,388,444 | B2 | 3/2013 | Graf |
| 8,454,436 | B2 | 6/2013 | Klostermann |
| 8,485,881 | B2 | 7/2013 | Griswold |
| 8,517,829 | B2 | 8/2013 | Reddy |
| 8,974,297 | B2 | 3/2015 | Massing |
| 9,652,929 | B2 | 5/2017 | Cornell |
| 9,728,030 | B2 | 8/2017 | Woels |
| 10,127,761 | B2 | 11/2018 | Woels |
| 10,636,244 | B1 | 4/2020 | Winston |
| 2004/0043815 | A1 | 3/2004 | Kaminkow |
| 2004/0121840 | A1 | 6/2004 | Rosander |
| 2004/0248648 | A1 | 12/2004 | Rothschild |
| 2005/0040962 | A1 | 2/2005 | Funkhouser |
| 2005/0043090 | A1 | 2/2005 | Pryzby |
| 2006/0046821 | A1 | 3/2006 | Kaminkow |
| 2006/0089190 | A1 | 4/2006 | Bryant |
| 2007/0111776 | A1 | 5/2007 | Griswold |
| 2007/0149281 | A1 | 6/2007 | Gadda |
| 2008/0113794 | A1 | 5/2008 | Cole |
| 2008/0265503 | A1 | 10/2008 | Wudtke |
| 2008/0268944 | A1 | 10/2008 | Wudtke |
| 2009/0104991 | A1 | 4/2009 | Seelig |
| 2009/0176568 | A1 | 7/2009 | Reddy |
| 2009/0253485 | A1 | 10/2009 | Nagano |
| 2010/0197397 | A1 | 8/2010 | Graf |
| 2010/0210354 | A1 | 8/2010 | Burak |
| 2011/0304781 | A1 | 12/2011 | Rowell |
| 2012/0002357 | A1 | 1/2012 | Auld |
| 2012/0178523 | A1 | 7/2012 | Greenberg |
| 2012/0220353 | A1 | 8/2012 | Massing |
| 2012/0231869 | A1 | 9/2012 | Englman |
| 2012/0280924 | A1 | 11/2012 | Kummer |
| 2014/0002430 | A1 | 1/2014 | Kwack |
| 2014/0141857 | A1 | 5/2014 | Meyer |
| 2014/0228091 | A1 | 8/2014 | Berman |
| 2014/0357364 | A1 | 12/2014 | Chudek |
| 2017/0156219 | A1 | 6/2017 | Heo |
| 2017/0325343 | A1 | 11/2017 | Seo |
| 2018/0276942 | A1 | 9/2018 | Whelan |
| 2019/0385401 | A1 | 12/2019 | Winston |
| 2020/0035061 | A1 | 1/2020 | Froy |
| 2020/0111285 | A1 | 4/2020 | Phillips, Jr. |

OTHER PUBLICATIONS

Notice of Allowance dated Mar. 10, 2020, for U.S. Appl. No. 16/151,197 (pp. 1-9).
Corrected Notice of Allowability dated Apr. 1, 2020, for U.S. Appl. No. 16/151,197 (pp. 1-2).
Office Action dated Jun. 10, 2019 for U.S. Appl. No. 16/009,043 (pp. 1-11).
Office Action dated Jan. 28, 2020 for U.S. Appl. No. 16/009,043 (pp. 1-11).
Office Action Oct. 21, 2019, for U.S. Appl. No. 16/151,197 (pp. 1-14).
Notice of Allowance dated Jul. 20, 2020 for U.S. Appl. No. 16/009,043 (pp. 1-6).
Office Action dated Jun. 4, 2020 for U.S. Appl. No. 16/009,043 (pp. 1-10).
TPA Motion's ASN telescopic Linear Guides. <https://www.tpa-us.com/asn-series.html>. Accessed May 28, 2020 (Year: 2020).
Notice of Allowance dated Oct. 15, 2020 for U.S. Appl. No. 16/009,043 (pp. 1-6).
Office Action dated May 7, 2021 for U.S. Appl. No. 16/849,505 (pp. 1-14).
Office Action (Notice of Allowance and Fees Due (PTOL-85)) dated Sep. 2, 2021 for U.S. Appl. No. 16/849,505 (pp. 1-9).
Office Action (Non-Final Rejection) dated Aug. 15, 2022 for U.S. Appl. No. 17/453,140 (pp. 1-10).
Office Action (Notice of Allowance and Fees Due (PTOL-85)) dated Oct. 11, 2022 for U.S. Appl. No. 17/453,140 (pp. 1-12).
Office Action (Non-Final Rejection) dated Jan. 4, 2023 for U.S. Appl. No. 17/664,391 (pp. 1-6).
Office Action (Notice of Allowance and Fees Due (PTOL-85)) dated Mar. 3, 2023 for U.S. Appl. No. 17/664,391 (pp. 1-5).
Office Action (Non-Final Rejection) dated Oct. 24, 2023 for U.S. Appl. No. 18/297,522 (pp. 1-6).
Office Action (Non-Final Rejection) dated Aug. 21, 2023 for U.S. Appl. No. 18/067,463 (pp. 1-5).
Office Action (Notice of Allowance and Fees Due (PTOL-85)) dated Jan. 3, 2024 for U.S. Appl. No. 18/297,522 (pp. 1-5).
Office Action (Notice of Allowance and Fees Due (PTOL-85)) dated Jan. 10, 2024 for U.S. Appl. No. 18/067,463 (pp. 1-8).
Australian Examination Report No. 1 issued in App. No. AU2019204078, dated Feb. 28, 2024, 3 pages.
Office Action (Notice of Allowance and Fees Due (PTOL-85)) dated Mar. 11, 2024 for U.S. Appl. No. 18/297,522 (pp. 1-2).
Australian Examination Report No. 1 issued in App. No. AU2019240569, dated Jun. 12, 2024, 3 pages.
Office Action (Non-Final Rejection) dated Sep. 18, 2024 for U.S. Appl. No. 18/605,748 (pp. 1-8).

GAMING SIGNAGE INCLUDING ONE OR MORE MOVABLE DISPLAY MONITORS

PRIORITY CLAIM

This application claims priority to, and is a continuation of, U.S. patent application Ser. No. 18/067,463, filed on Dec. 16, 2022 and entitled "GAMING SIGNAGE INCLUDING ONE OR MORE MOVABLE DISPLAY MONITORS," now issued as U.S. Pat. No. 11,935,355, which itself is a continuation of U.S. patent application Ser. No. 17/453,140, filed on Nov. 1, 2021 and entitled "GAMING SIGNAGE INCLUDING ONE OR MORE MOVABLE DISPLAY MONITORS," now issued as U.S. Pat. No. 11,532,202, which itself is a continuation of U.S. patent application Ser. No. 16/849,505, filed on Apr. 15, 2020, and entitled "GAMING SIGNAGE INCLUDING ONE OR MORE MOVABLE DISPLAY MONITORS," now issued as U.S. Pat. No. 11,183,005, which itself is a continuation of U.S. patent application Ser. No. 16/151,197, filed on Oct. 3, 2018 and entitled "GAMING SIGNAGE INCLUDING ONE OF MORE MOVABLE DISPLAY MONITORS," now issued as U.S. Pat. No. 10,636,244, all of which are hereby incorporated by reference and for all purposes.

BACKGROUND

Electronic gaming machines ("EGMs") or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In many games, a player may qualify for secondary games or bonus rounds by attaining a certain winning combination or triggering event in the base game. Secondary games provide an opportunity to win additional game instances, credits, awards, jackpots, progressives, etc. Awards from any winning outcomes are typically added back to the credit balance and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for ready identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Typical games use a random number generator (RNG) to randomly determine the outcome of each game. The game is designed to return a certain percentage of the amount wagered back to the player (RTP=return to player) over the course of many plays or instances of the game. The RTP and randomness of the RNG are critical to ensuring the fairness of the games and are therefore highly regulated. Upon initiation of play, the RNG randomly determines a game outcome and symbols are then selected which correspond to that outcome. Notably, some games may include an element of skill on the part of the player and are therefore not entirely random.

SUMMARY

A gaming signage system may include one or more movable displays. In some examples, at least one movable display may be used to present first visual effects when in a first configuration. The first visual effects may, for example, include game theme images, an attract sequence, or other visual effects. When the one or more movable displays are moved from the first configuration to a second configuration, the movable display(s) may reveal what will be referred to herein as a "game feature presentation device," which was hidden when the one or more movable displays were in the first configuration. The game feature presentation device may, for example, include a stationary display, mechanical reels, etc. The one or more movable displays may be moved in response to a trigger event indication, which may be related to an occurrence in a game that is being presented on a nearby EGM. The game feature presentation device may, for example, be used to present a bonus feature, to present an aspect of the base game and/or to present graphics during a celebration.

In alternative implementations, one or more movable displays may be hidden from view (e.g., inside a cabinet of the gaming signage system) when the one or more movable displays are in a first configuration. In some such examples, a fixed display portion may be used to present the first visual effects when the one or more movable displays are in the first configuration. The movable display(s) may be controlled to present visual effects corresponding to a bonus game, to present an aspect of the base game and/or to present graphics during a celebration when in the second configuration.

DETAILED DESCRIPTION

Figure 1:
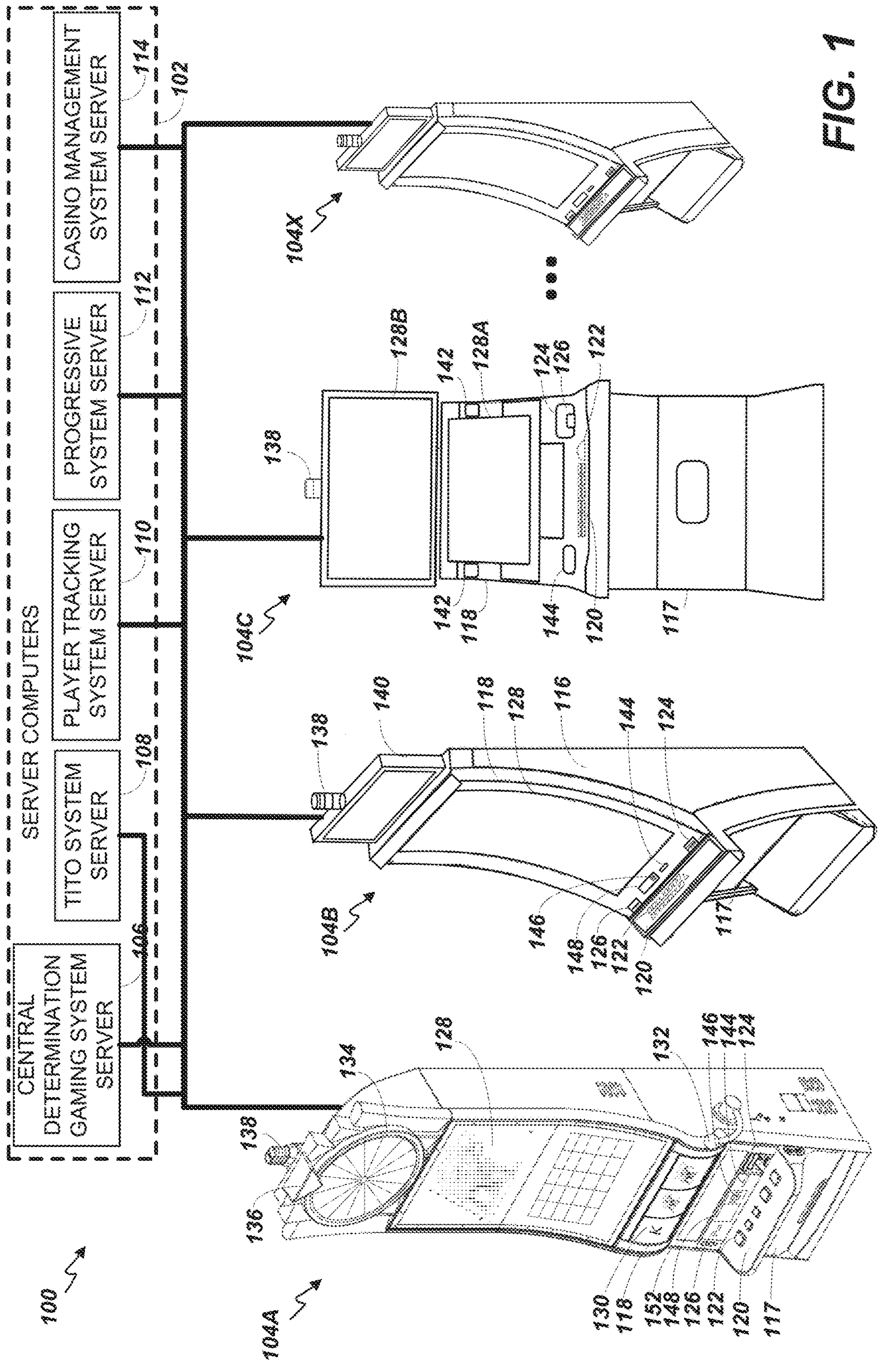
FIG. 1 is a diagram showing examples of several EGMs networked with various gaming related servers.

FIG. 1 illustrates several different models of EGMs which may be networked to various gaming related servers. The present invention can be configured to work as a system 100 in a gaming environment including one or more server computers 102 (e.g., slot servers of a casino) that are in communication, via a communications network, with one or more gaming devices 104A-104X (EGMs, slots, video poker, bingo machines, etc.). The gaming devices 104A-104X may alternatively be portable and/or remote gaming devices.

Communication between the gaming devices 104A-104X and the server computers 102, and among the gaming devices 104A-104X, may be direct or indirect, such as over the Internet through a website maintained by a computer on a remote server or over an online data network including commercial online service providers, Internet service providers, private networks, and the like. In other embodiments, the gaming devices 104A-104X may communicate with one another and/or the server computers 102 over RF, cable TV, satellite links and the like.

In some embodiments, server computers 102 may not be necessary and/or preferred. For example, the present invention may, in one or more embodiments, be practiced on a stand-alone gaming device such as gaming device 104A, gaming device 104B or any of the other gaming devices 104C-104X. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door 117 which provides access to the interior of the cabinet. Gaming device 104A typically includes a button area or button deck 120 accessible by a player that is configured with input switches or buttons 122, an access channel for a bill validator 124, and/or an access channel for a ticket printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The reels 130 are independently spun and stopped to show a set of symbols within the gaming display area 118 which may be used to determine an outcome to the game.

In many configurations, the gaming machine 104A may have a main display 128 (e.g., video display monitor) mounted to, or above, the gaming display area 118. The main display 128 can be a high-resolution LCD, plasma, LED, or OLED panel which may be flat or curved as shown, a cathode ray tube, or other conventional electronically controlled video monitor.

In some embodiments, the bill validator 124 may also function as a "ticket-in" reader that allows the player to use a casino issued credit ticket to load credits onto the gaming device 104A (e.g., in a cashless ticket ("TITO") system). In such cashless embodiments, the gaming device 104A may also include a "ticket-out" printer 126 for outputting a credit ticket when a "cash out" button is pressed. Cashless TITO systems are well known in the art and are used to generate and track unique bar-codes or other indicators printed on tickets to allow players to avoid the use of bills and coins by loading credits using a ticket reader and cashing out credits using a ticket-out printer 126 on the gaming device 104A.

In some embodiments, a player tracking card reader 144, a transceiver for wireless communication with a player's smartphone, a keypad 146, and/or an illuminated display 148 for reading, receiving, entering, and/or displaying player tracking information is provided in EGM 104A. In such embodiments, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some embodiments, the information panel(s) 152 may be implemented as an additional video display.

Gaming devices 104A have traditionally also included a handle 132 typically mounted to the side of main cabinet 116 which may be used to initiate game play.

Figure 2:
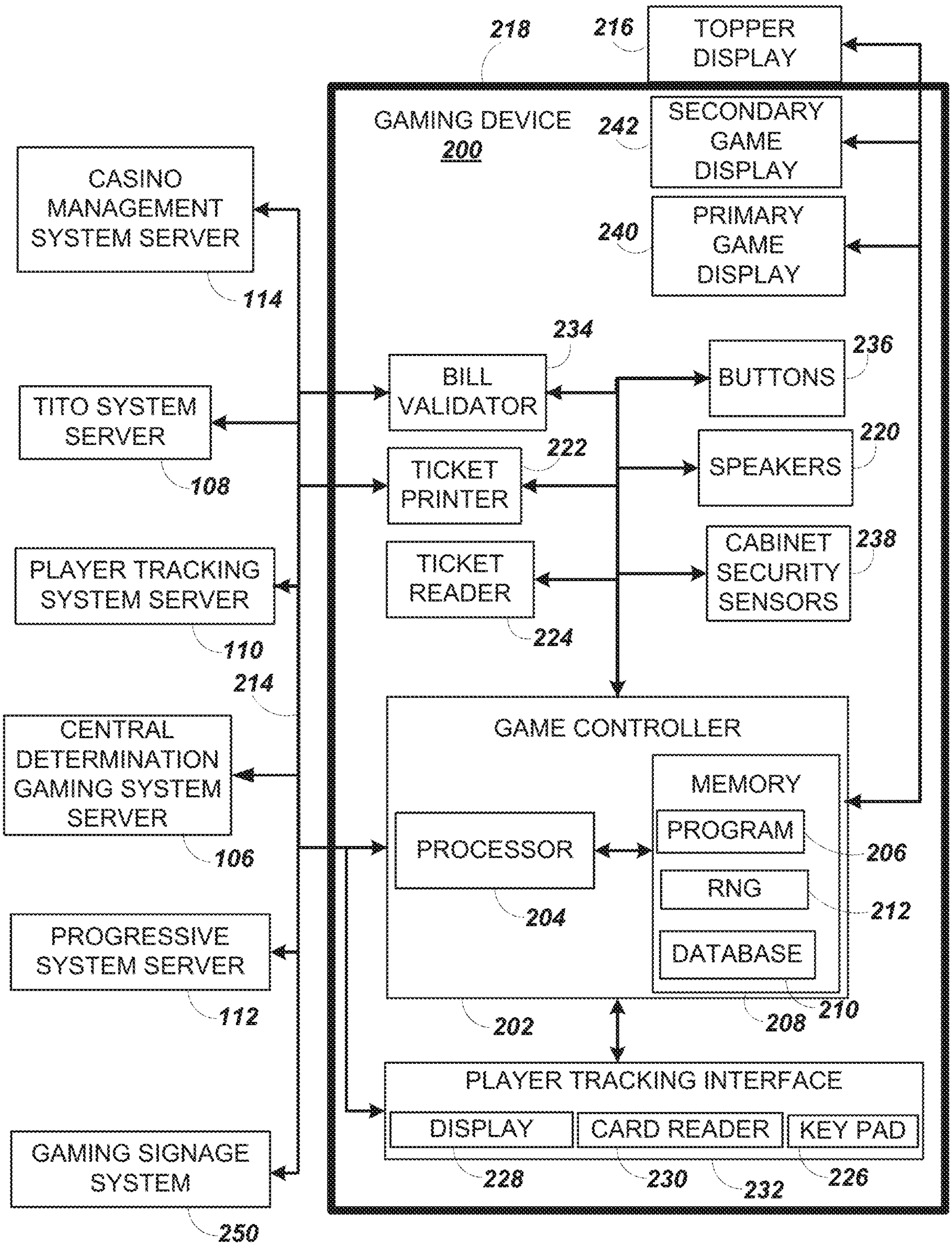
FIG. 2 is a block diagram showing examples of various functional elements of an EGM.

Many or all the above described components can be controlled by circuitry (e.g., a gaming controller) housed inside the main cabinet 116 of the gaming device 104A, the details of which are shown in FIG. 2.

Note that not all gaming devices suitable for implementing embodiments of the present invention necessarily include top wheels, top boxes, information panels, cashless ticket systems, and/or player tracking systems. Further, some suitable gaming devices have only a single game display that includes only a mechanical set of reels and/or a video display, while others are designed for bar counters or table tops and have displays that face upwards.

An alternative example gaming device 104B illustrated in FIG. 1 is the Arc™ model gaming device manufactured by Aristocrat® Technologies, Inc. Note that where possible, reference numerals identifying similar features of the gaming device 104A embodiment are also identified in the gaming device 104B embodiment using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some embodiments, topper screen 140 may also or alternatively be used to display progressive jackpot prizes available to a player during play of gaming device 104B.

Example gaming device 104B includes a main cabinet 116 including a main door 117 which opens to provide access to the interior of the gaming device 104B. The main or service door 117 is typically used by service personnel to refill the ticket-out printer 126 and collect bills and tickets inserted into the bill validator 124. The door 117 may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the landscape display 128A may have a curvature radius from top to bottom, or alternatively from side to side. In some embodiments, display 128A is a flat panel display. Main display 128A is typically used for primary game play while secondary display 128B is typically used for bonus game play, to show game features or attraction activities while the game is not in play or any other information or media desired by the game designer or operator.

Many different types of games, including mechanical slot games, video slot games, video poker, video black jack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2 is a block diagram depicting examples of internal electronic components of a gaming device 200 connected to various external systems. All or parts of the example gaming device 200 shown could be used to implement any one of the example gaming devices 104A-X depicted in FIG. 1. The games available for play on the gaming device 200 are controlled by a game controller 202 that includes one or more processors 204 and a game that may be stored as game software or a program 206 in a memory 208 coupled to the processor 204. The memory 208 may include one or more mass storage devices or media that are housed within gaming device 200. Within the mass storage devices and/or memory 208, one or more databases 210 may be provided for use by the program 206. A random number generator (RNG) 212 that can be implemented in hardware and/or software is typically used to generate random numbers that are used in the operation of game play to ensure that game play outcomes are random and meet regulations for a game of chance.

Alternatively, a game instance (i.e. a play or round of the game) may be generated on a remote gaming device such as the central determination gaming system server 106. The game instance may be communicated to gaming device 200 via the network 214 and then displayed on gaming device 200. Gaming device 200 may execute game software, such as but not limited to video streaming software that allows the game to be displayed on gaming device 200. When a game is stored on gaming device 200, it may be loaded from a memory 208 (e.g., from a read only memory (ROM)) or from the central determination gaming system server 106 to memory 208. The memory 208 may include RAM, ROM or another form of storage media that stores instructions for execution by the processor 204.

The gaming device 200 may include a topper display 216 or another form of a top box (e.g., a topper wheel, a topper screen, etc.) which sits above main cabinet 218. The gaming cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. The player tracking interface 232 may include a keypad 226 for entering information, a player tracking display 228 for displaying information (e.g., an illuminated or video display), and a card reader 230 for receiving data and/or communicating information to and from media or a device such as a smart phone enabling player tracking. Ticket printer 222 may be used to print tickets for a TITO system server 108. The gaming device 200 may further include a bill validator 234, buttons 236 for player input, cabinet security sensors 238 to detect unauthorized opening of the cabinet 218, a primary game display 240, and a secondary game display 242, each coupled to and operable under the control of game controller 202.

Gaming device 200 may be connected over network 214 to player tracking system server 110. Player tracking system server 110 may be, for example, an OASIS® system manufactured by Aristocrat® Technologies, Inc. Player tracking system server 110 is used to track play (e.g. amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

Gaming devices, such as gaming devices 104A-104X, 200, are highly regulated to ensure fairness and, in many cases, gaming devices 104A-104X, 200 are operable to award monetary awards (e.g., typically dispensed in the form of a redeemable voucher). Therefore, to satisfy security and regulatory requirements in a gaming environment, hardware and software architectures are implemented in gaming devices 104A-104X, 200 that differ significantly from those of general-purpose computers. Adapting general purpose computers to function as gaming devices 200 is not simple or straightforward because of: 1) the regulatory requirements for gaming devices 200, 2) the harsh environment in which gaming devices 200 operate, 3) security requirements, 4) fault tolerance requirements, and 5) the requirement for additional special purpose componentry enabling functionality of an EGM. These differences require substantial engineering effort with respect to game design implementation, hardware components and software.

When a player wishes to play the gaming device 200, he/she can insert cash or a ticket voucher through a coin acceptor (not shown) or bill validator 234 to establish a credit balance on the gamine machine. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views the game outcome on the game displays 240, 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

In this example, the gaming device 200 is also configured for communication with a gaming signage system 250 via the network 214. Various examples of gaming signage systems 250 are provided herein. According to some examples, the gaming signage system 250 may be configured for communication with other elements of a gaming system via the network 214, such as the central determination gaming system server 106, the progressive system server 112, the player tracking system server 110 the casino management system server 114 and/or the TITO system server 108.

When the player is done, he/she cashes out the credit balance (typically by pressing a cash out button to receive a ticket from the ticket printer 222). The ticket may be "cashed-in" for money or inserted into another machine to establish a credit balance for play.

Figure 3A:
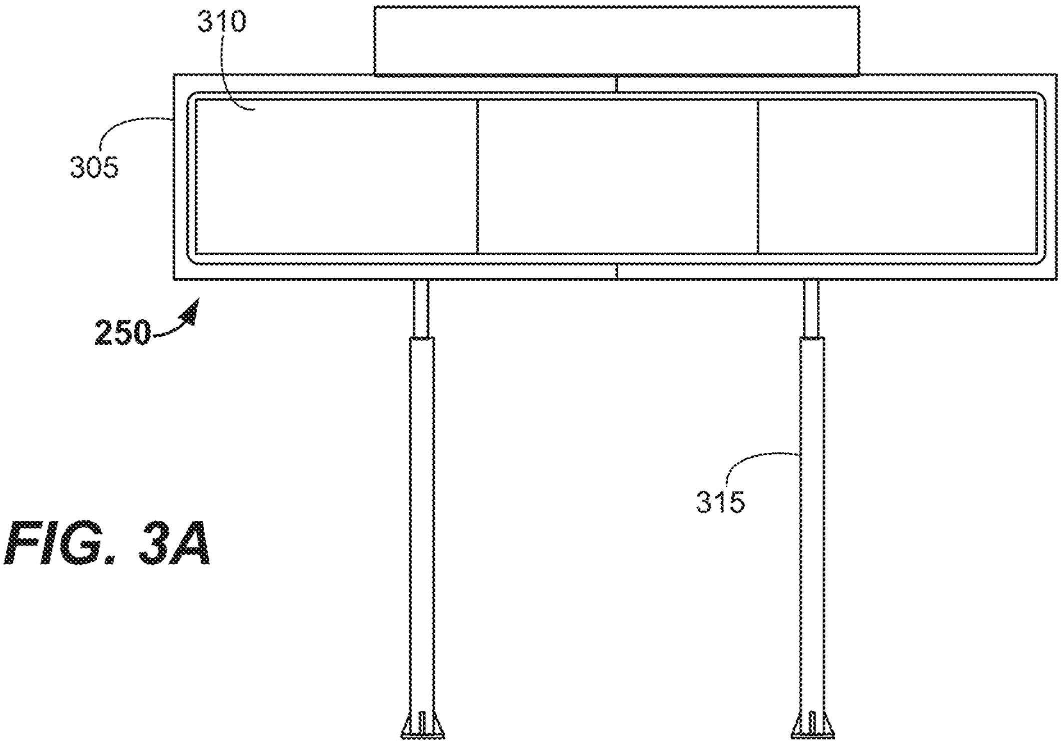
FIGS. 3A and 3B are front and side views of a gaming signage system according to one example.
Figure 3B:
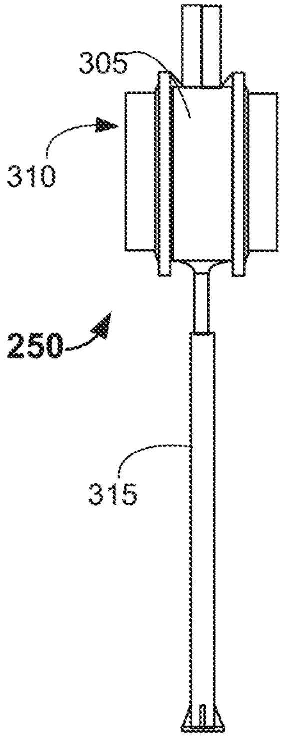

FIGS. 3A and 3B are front and side views of a gaming signage system according to one example. In these examples, the gaming signage system 250 includes a cabinet 305 and displays 310. In some implementations, the gaming signage system 250 includes a motor system configured for moving one or more of the displays 310 according to signals from a control system.

The cabinet 305 is supported by support structures 315 in this example. In alternative examples, the cabinet 305 may be supported by one or more cables, such as cables attached to a ceiling of a casino.

Figure 3C:
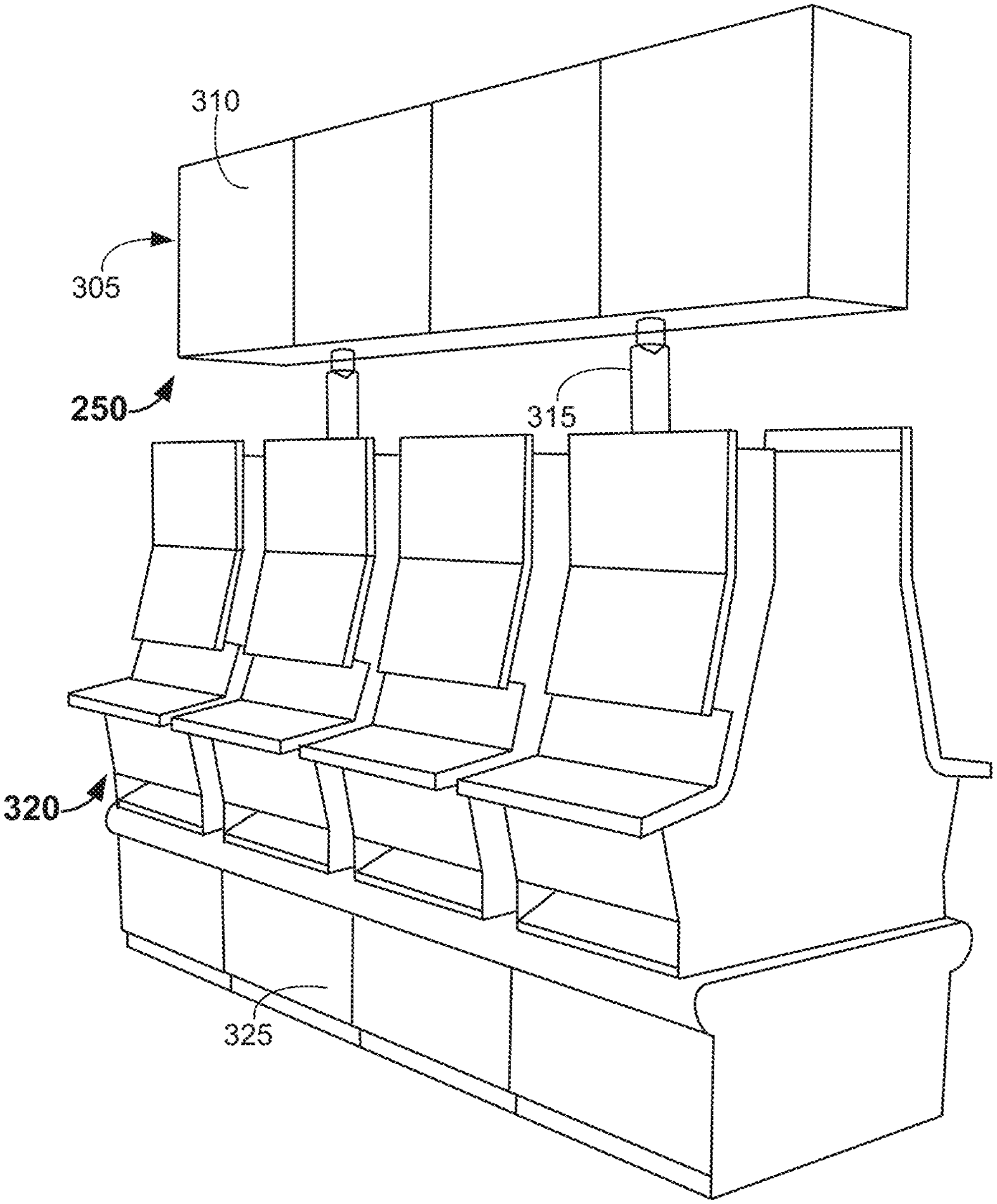
FIG. 3C shows a perspective view of a gaming signage system above a bank of EGMs according to one example.

FIG. 3C shows a perspective view of a gaming signage system above a bank of EGMs according to one example. In this example, the gaming signage system 250 is positioned above the bank of EGMs 320 by the support structures 315. Here, the gaming signage system 250 includes 4 displays 310, one display over each EGM. In this implementation, the bank of EGMs 320 and the support structures 315 are both supported by the base 325.

Figure 4:
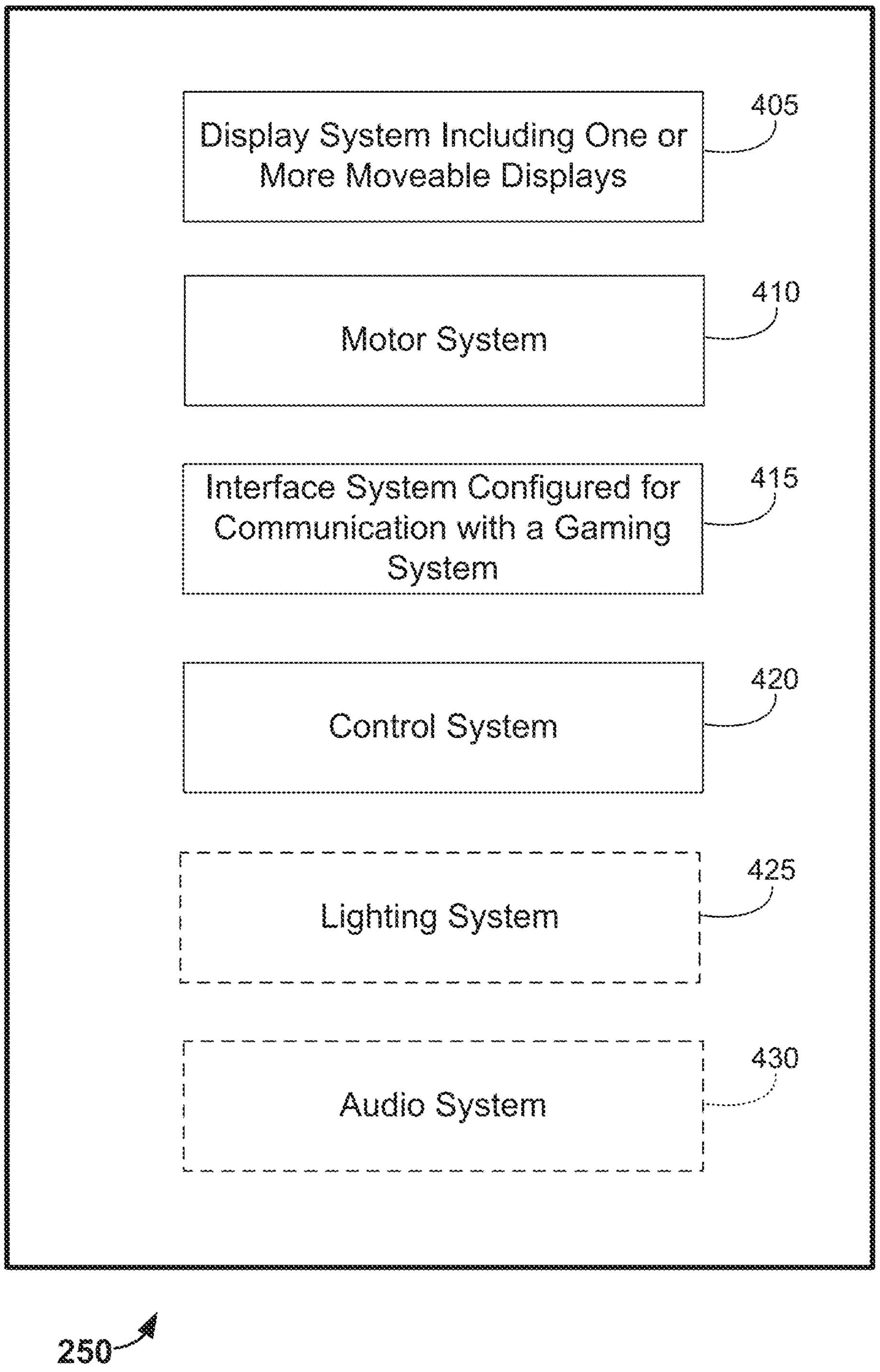
FIG. 4 is a block diagram that shows blocks of a gaming signage system according to one example.

FIG. 4 is a block diagram that shows blocks of a gaming signage system according to one example. According to this example, the gaming signage system 250 includes a display system 405, a motor system 410, an interface system 415 and a control system 420. In some examples, the gaming signage system 250 may include an optional lighting system 426 and/or an optional audio system 430.

The display system 405 may, in some implementations, include one or more movable displays. The display system 405 may include, one or more liquid crystal displays (LCDs), plasma displays, light-emitting diode (LED) displays, microLED displays or organic light-emitting diode (OLED) displays. According to some implementations, the display system 405 may include at least one flexible display, such as a flexible OLED.

In some implementations, the motor system 410 may include one or more electric motors that are configured to position the movable display(s) of the display system 405, such as one or more stepper motors, servo motors, DC motors using pulse width modulation, etc. Alternatively or additionally, the motor system 410 may include one or more linear actuators and/or an electromagnetic system. Alternatively or additionally, the motor system 410 may include components that are configured to position the movable displays using compressed air or hydraulic fluid. Various examples are described below with reference to FIGS. 10A-13B. The motor system 410 may be configured to position the movable display(s) according to signals from the control system 420.

In this example, the interface system 415 provides one or more interfaces for wired and/or wireless communications between the gaming signage system 250 and at least a portion of a gaming system, e.g., by electrical connectivity. In some implementations, the interface system 415 is configured for communication between the gaming signage system 250 and at least a portion of a gaming machine control system. The gaming machine control system may be, or may include, an instance of the game controller 202 described above with reference to FIG. 2. In some implementations, the interface system 415 is configured for communication between the gaming signage system 250 and one or more other devices of a gaming system, such as other EGMs in a bank of EGMs, a progressive system server, a central determination gaming system server, a player tracking system server, etc. In some disclosed implementations, the gaming signage system 250 may receive information from a player tracking system of an EGM via the interface system 405.

In this example, the control system 420 is configured for controlling elements of the gaming signage system 250. In some instances, the control system 420 may be configured for controlling elements of the gaming signage system 250 at least in part according to signals received from an EGM via the interface system 415. In some such examples, the control system 420 may be configured for controlling one or more elements of the gaming signage system 250 at least in part according to signals received from a gaming machine control system via the interface system 415. Alternatively, or additionally, the control system 420 may be configured for controlling elements of the gaming signage system 250 at least in part according to signals received from another component of a gaming system, such as a progressive system server, a central determination gaming system server, a player tracking system server, etc.

The control system 420 may include at least one of a general purpose single- or multi-chip processor, a digital signal processor (DSP), an application specific integrated circuit (ASIC), a field programmable gate array (FPGA) or other programmable logic device, discrete gate or transistor logic, or discrete hardware components. Accordingly, the control system 420 may include one or more processors. In some implementations the control system 420 may include one or more non-transitory storage media operatively coupled to the one or more processors.

Figure 5:
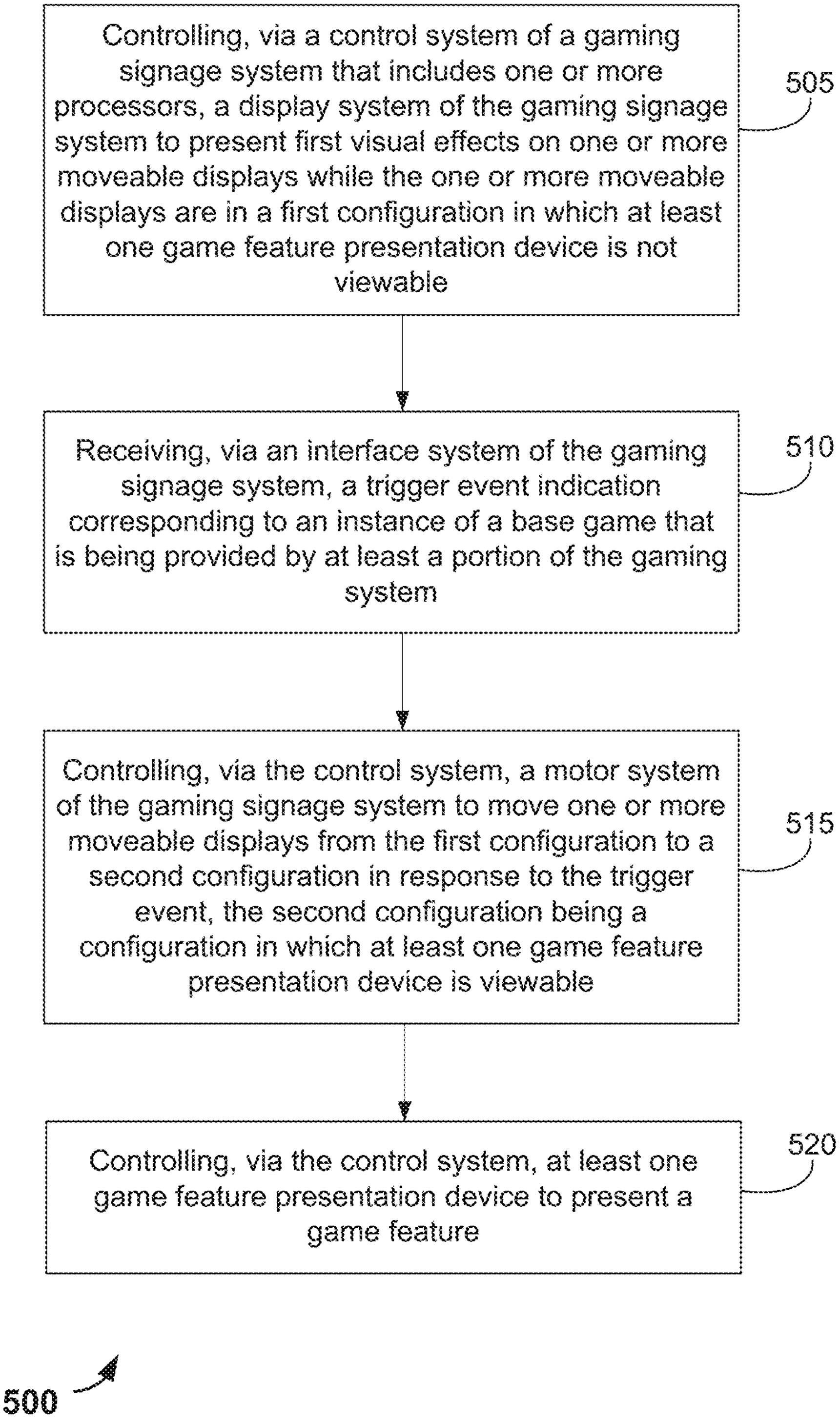
FIG. 5 is a flow diagram that shows blocks of a method according to one example.

FIG. 5 is a flow diagram that shows blocks of a method according to one example. Method 500 may be performed, at least in part, by a control system of a gaming signage system. In some examples, the method 500 may be performed by a gaming signage system according to software stored upon one or more non-transitory storage media. As with other methods described herein, the number and sequence of blocks shown in FIG. 5 are merely examples. Similar disclosed methods may include more or fewer blocks. Moreover, at least some of the blocks may occur in a different sequence than the sequence that is shown in a flow diagram.

According to this example, block 505 involves controlling, via a control system of a gaming signage system that includes one or more processors, a display system of the gaming signage system to present first visual effects on one or more movable displays while the one or more movable displays are in a first configuration. In this example, at least one game feature presentation device is not viewable while the one or more movable displays are in a first configuration. The game feature presentation device may, for example, include a stationary display, a movable display, mechanical reels, a mechanical wheel, etc.

The first visual effects may, in some instances, correspond with a game theme. For example, referring to FIG. 3C, the bank of EGMs 320 may be configured to present games corresponding to a particular game theme, such as a Tarzan theme, a Game of Thrones theme, a Walking Dead theme, etc. One or more movable displays of the gaming signage system 250 may present first visual effects corresponding to the game theme while the one or more movable displays are in the first configuration.

According to this example, block 510 involves receiving, via an interface system of the gaming signage system, a trigger event indication corresponding to an instance of a base game that is being provided by at least a portion of the gaming system. The base game may be a video slot game, a video poker game, a video black jack game, a video pachinko game, a keno game, a bingo game, etc. In some examples, the trigger event indication may correspond to an instance of a base game that is being provided by an EGM that is in a bank of gaming machines below at least a portion of the gaming signage system. In some such implementations, the trigger event indication may be received from the EGM on which the base game is being provided.

In some examples, the trigger event may correspond to the presentation of a predetermined combination of symbols during the base game. According to some examples, the trigger event may correspond to a win of the base game. Alternatively, or additionally, the trigger event may correspond to the award of one or more bonus games, which may or may not be instances of the base game.

However, in some alternative implementations the trigger event may be unrelated to an event of a base game or of a bonus game. According to some such examples the trigger event may be determined by a random number generator (such as the RNG 212 that is described above with reference to FIG. 2) that is implemented by the control system of an EGM. However, in some examples block 510 may involve receiving a trigger event indication determined by a device other than the EGM that is presenting the base game. In some implementations determining a trigger event may involve receiving, via a network interface system of an EGM, data corresponding to the trigger event. Such data may, for example, be received from a game server or a progressive system server. Accordingly, in some alternative implementations, the trigger event indication may be received from another device, such as a gaming server (e.g., from an instance of the central determination gaming system server 106 that is described above with reference to FIGS. 1 and 2.

In some alternative implementations, block 510 may involve receiving a trigger event indication corresponding to an instance of a base game that is being provided by an EGM that not in the proximity of the gaming signage system. For example, the trigger event indication may be significant enough (e.g., the win of a large progressive award) to present on signage of a casino that is not in the vicinity of the EGM.

In this implementation, block 515 involves controlling, via the control system, a motor system of the gaming signage system to move one or more movable displays from the first configuration to a second configuration in response to the trigger event. In this example, the second configuration is a configuration in which at least one game feature presentation device is viewable. Block 515 may, for example, involve a control system of a gaming signage system controlling a motor system of the gaming signage system. The motor system may include one or more electric motors that are configured to position the movable display(s).

In some examples, the one or more movable displays may include at least two movable displays. The control system may be configured to control the motor system to move each of the two movable displays laterally from the first configuration to the second configuration. In alternative examples, the control system may be configured to control the motor system to rotate each of the two movable displays during a process of moving the two movable displays from the first configuration to the second configuration. According to some implementations, the control system may be configured to control the motor system to raise one or more movable displays from the first configuration to the second configuration. Alternatively, or additionally, in some examples the control system may be configured to control the motor system to lower one or more movable displays from the first configuration to the second configuration. In some examples, the one or more movable displays may include at least one flexible display. Various examples are described below with reference to FIGS. 12A-13B.

According to this example, block 520 involves presenting a game feature on at least one game feature presentation device. The game feature may vary according to the particular implementation. In some examples, the game feature may include visual effects corresponding to a bonus game, visual effects corresponding to an aspect of the base game that was not previously being presented on the movable display(s) and/or visual effects corresponding to a presentation of a celebration. As noted above, the game feature presentation device may include a stationary display, a movable display, mechanical reels, a mechanical wheel, etc.

Accordingly, the game feature will generally correspond with the particular type(s) of game feature presentation device(s) that are included in the gaming signage system, as well as the type of trigger event. For example, if the trigger event corresponds to the award of one or more bonus games, the game feature presented in block 520 may be, or may correspond to, the bonus game(s).

In some such examples, if a game feature presentation device includes mechanical reels, these mechanical reels may be used to provide free spins of a bonus game in block 520, regardless of whether the base game was a slot game or another type of game. In another example, if a game feature presentation device includes a stationary display that was hidden when the one or more movable displays were in the first configuration, the stationary display may be used to present a bonus feature, such as one or more instances of a bonus game. The bonus game may or may not be the same type of game as the base game that was presented on the EGM. For example, if the base game that was presented on the EGM was a video poker game, the bonus game presented by the game feature presentation device(s) may be a slot game or a spinning wheel game, such as a simulated roulette game. Alternatively, or additionally, the bonus feature presented by the game feature presentation device(s) may be a simulated spin of a bonus wheel.

According to some implementations, the movable display(s) may be used to present visual effects corresponding to those that are presented by the game feature presentation device. For example, if a trigger event indication corresponds to the presentation of a bonus game on the game feature presentation device, the movable display(s) may be used to present visual effects corresponding to the bonus game while the game feature presentation device presents the bonus game. If a player wins the bonus game, the movable display(s) and/or the game feature presentation device(s) may be used to present visual effects corresponding to a celebration of the player's win.

In some such examples, a lighting system and/or an audio system may provide effects corresponding to what is presented, or what will be presented, by the game feature presentation device(s). As noted above with reference to FIG. 4, in some implementations a gaming signage system may include a lighting system and/or an audio system. Alternatively, or additionally, other devices of a casino may include a lighting system and/or an audio system that is provide effects corresponding to what is presented, or what will be presented, by the game feature presentation device (s). According to some such implementations, the lighting system and/or audio system of a gaming signage system may provide effects corresponding to movement of the movable displays to reveal the game feature presentation device(s), effects corresponding to presentation of a game feature on the game feature presentation device(s) and/or effects corresponding to a celebration of the player's win. Such effects may include one or more flashing lights, revolving lights, sirens, fanfares, guitar riffs, keyboard phrases, vocals, mechanical bell etc. The lighting colors and/or sounds may correspond to the game theme. For example, if the game theme is a Britney Spears theme, the audio effects may include music from a Britney Spears song. In some implementations, the movable display(s) and/or the game feature presentation device(s) of a gaming signage system may be used to present visual effects corresponding to effects provided by the lighting system and/or audio system.

Figure 6A:
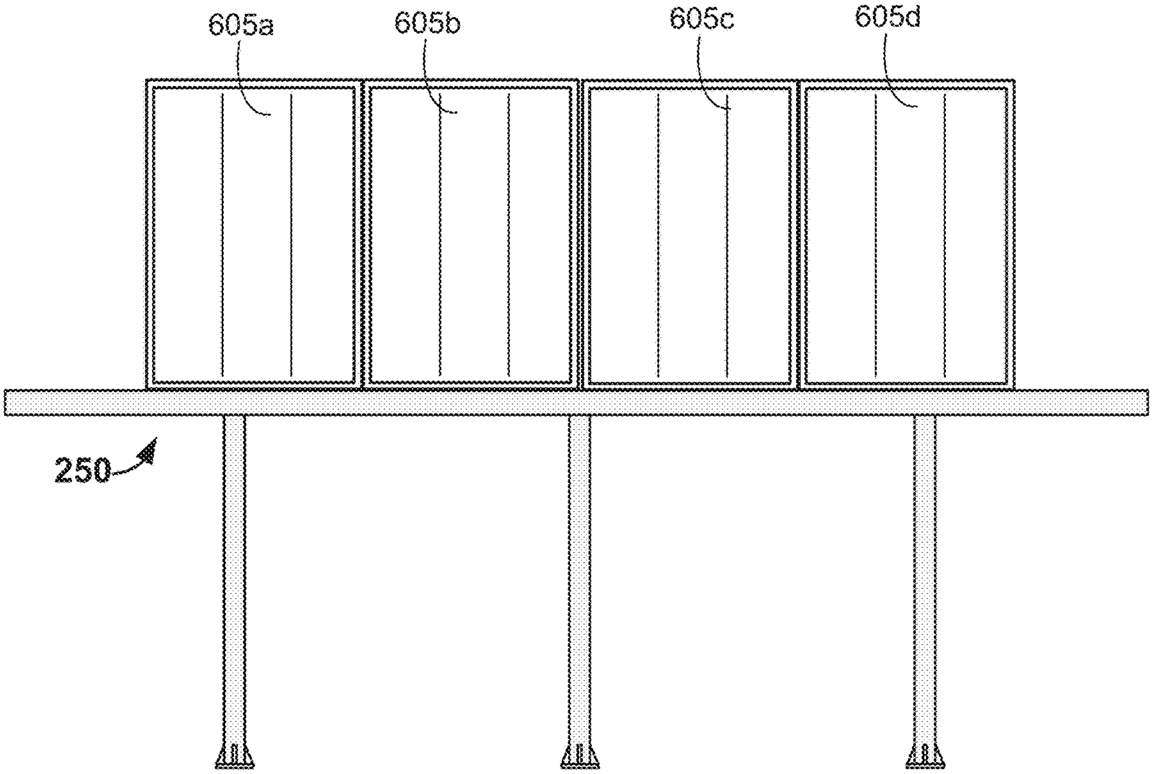
FIG. 6A shows an example of a gaming signage system having movable displays in a first configuration in which at least one game feature presentation device is not viewable.

FIG. 6A shows an example of a gaming signage system having movable displays in a first configuration in which at least one game feature presentation device is not viewable. In this example, the gaming signage system 250 includes movable displays 605*a*-605*d*. The movable displays 605*a*-605*d* may include one or more liquid crystal displays (LCDs), plasma displays, light-emitting diode (LED) displays, microLED displays or organic light-emitting diode (OLED) displays. As with the other implementations disclosed herein, the numbers, types and arrangements of elements shown in FIG. 6A are merely provided by way of example.

Figure 6B:
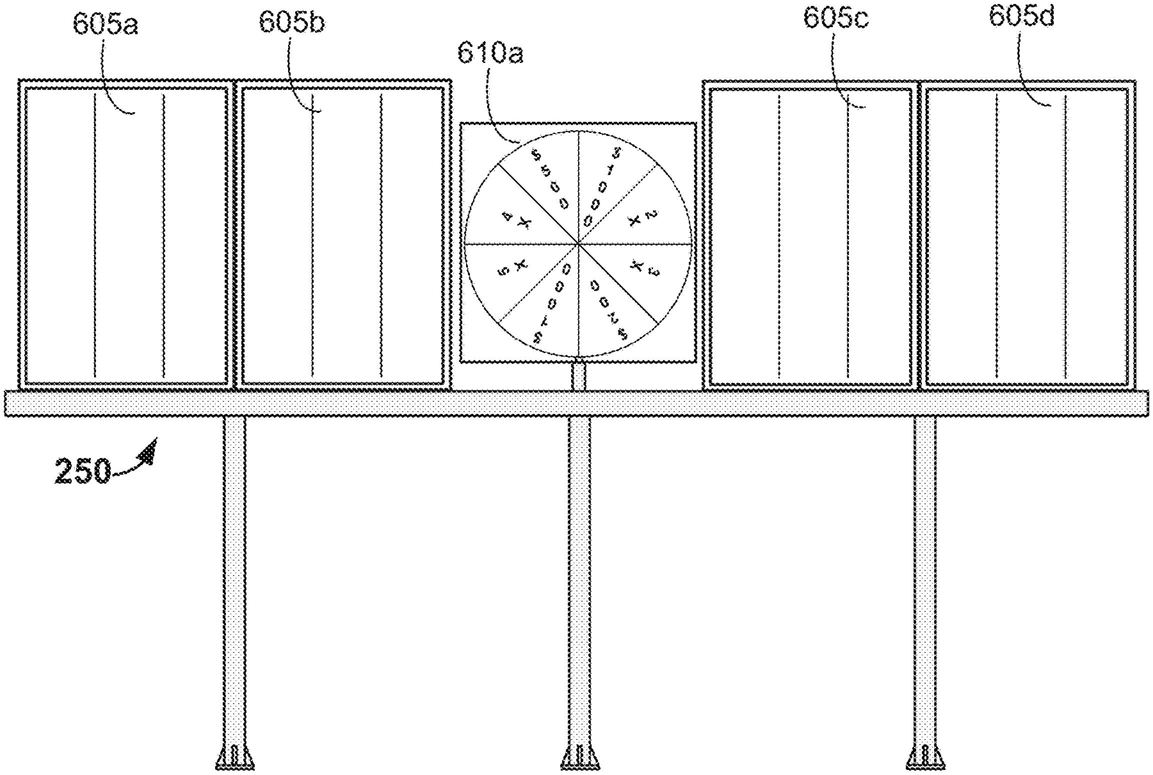
FIG. 6B shows an example in which the gaming signage system of FIG. 6A has positioned the movable displays in a second configuration in which at least one game feature presentation device is viewable.

FIG. 6B shows an example in which the gaming signage system of FIG. 6A has positioned the movable displays in a second configuration in which at least one game feature presentation device is viewable. In this example, a motor system of the gaming signage system 250 has moved movable displays 605*a* and 605*b* to the left and has moved movable displays 605*c* and 605*d* to the right, revealing the game feature presentation device 610*a*. According to this example, the motor system has moved the movable displays from the first configuration to the second configuration in response to a trigger event indication, e.g., as described elsewhere herein. In this implementation, the game feature presentation device 610*a* includes a stationary display that is configured for presenting a bonus wheel corresponding to a bonus game. The game feature presentation device 610*a* is configured to present a game feature, which in this example includes a depiction of a spinning bonus wheel. In alternative implementations, the game feature presentation device 610*a* may include other features, such as a physical wheel, a display of slot game reels, mechanical reels, etc.

Figure 6C:
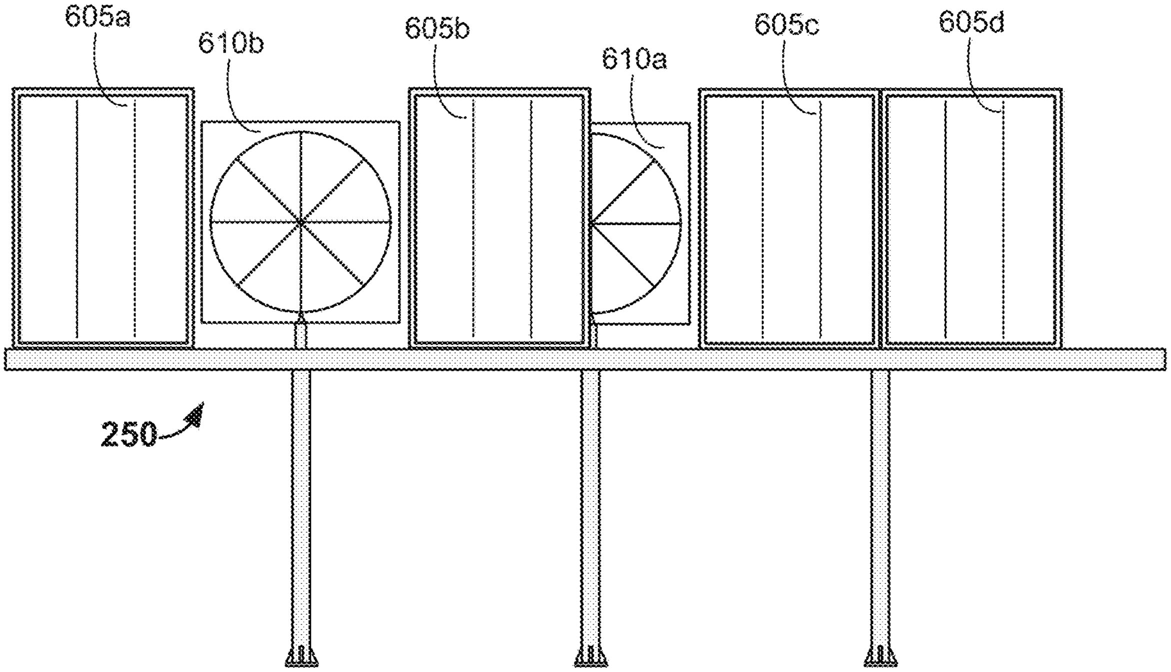
FIG. 6C shows an example of a gaming signage system having movable displays and more than one game feature presentation device.

FIG. 6C shows an example of a gaming signage system having movable displays and more than one game feature presentation device. In this example, a motor system of the gaming signage system 250 has moved movable displays 605*a* and 605*b* to reveal the game feature presentation device 610*b*. Here, the motor system has moved movable displays 605*c* and 605*d* to the right, partially revealing the game feature presentation device 610*a*. However, in this example the movable display 605*b* is partially obscuring the game feature presentation device 610*a*. This configuration may, for example, correspond to a situation in which the game feature presentation device 610*a* is about to be completely revealed, by re-positioning the movable display 605*b*, or a situation in which the game feature presentation device 610*a* is about to be concealed by re-positioning the movable displays 605*c* and 605*d* to the left.

Figure 6D:
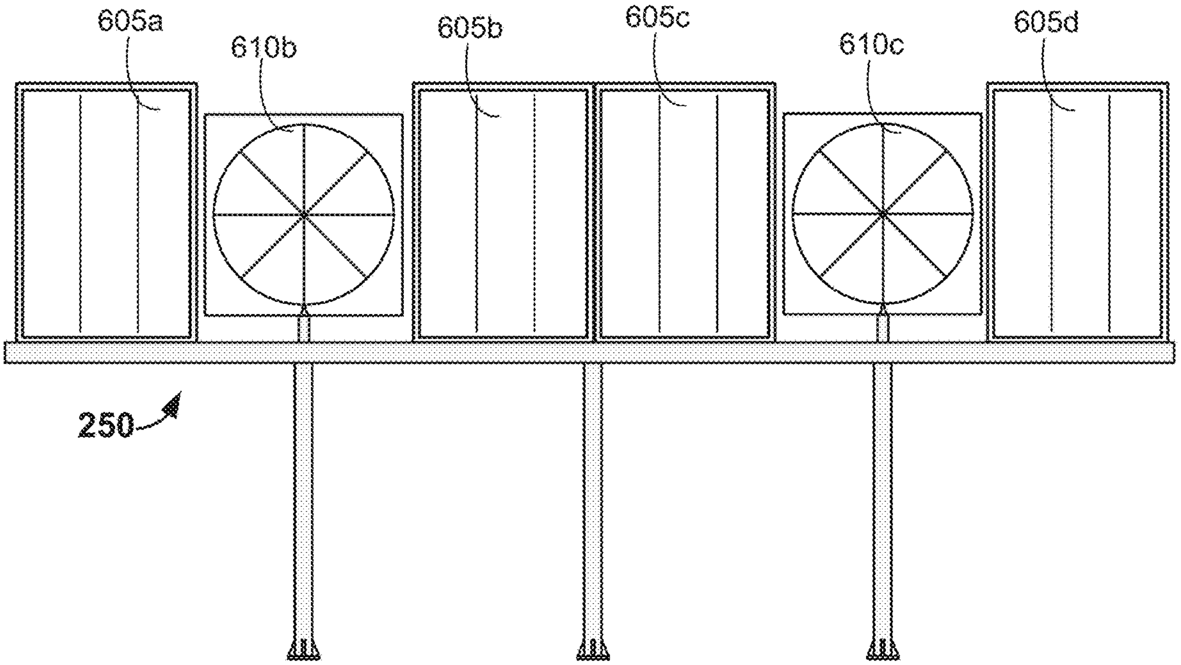
FIG. 6D shows another example of a gaming signage system having movable displays and more than one game feature presentation device.

FIG. 6D shows another example of a gaming signage system having movable displays and more than one game feature presentation device. In this example, a motor system of the gaming signage system 250 has moved movable displays 605*a* and 605*b* to reveal the game feature presentation device 610*b*. According to this example, the motor system has moved movable display 605*d* to the right, revealing the game feature presentation device 610*c*. In some such implementations, the gaming signage system 250 may include another game feature presentation device that is currently concealed by the movable displays 605*b* and 605*c*. However, in alternative examples the gaming signage system 250 does not include another game feature presentation device.

Figure 7:
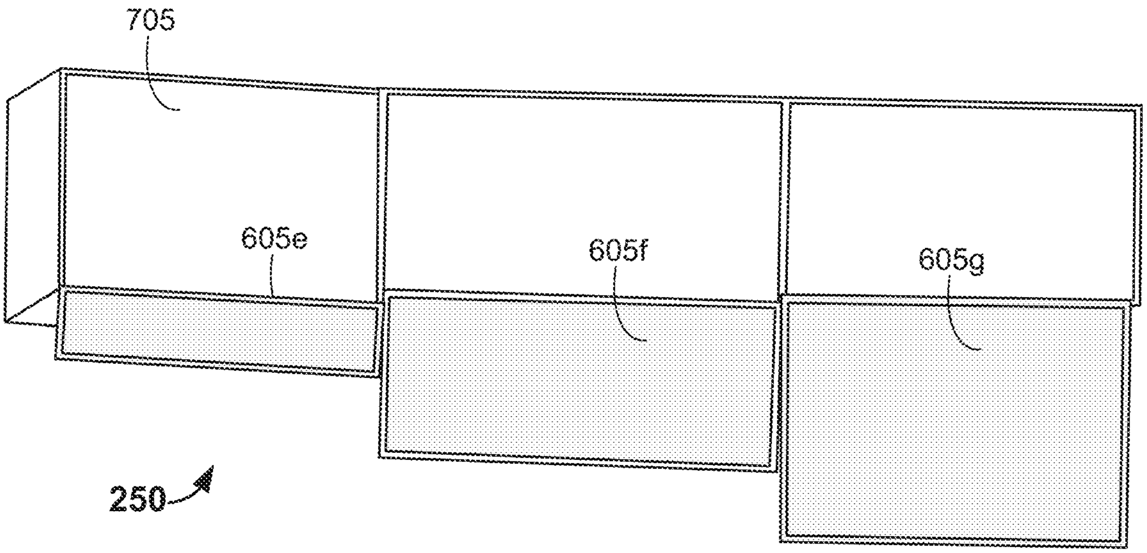
FIGS. 7 and 8 show alternative examples of gaming signage systems having movable displays.
Figure 8:
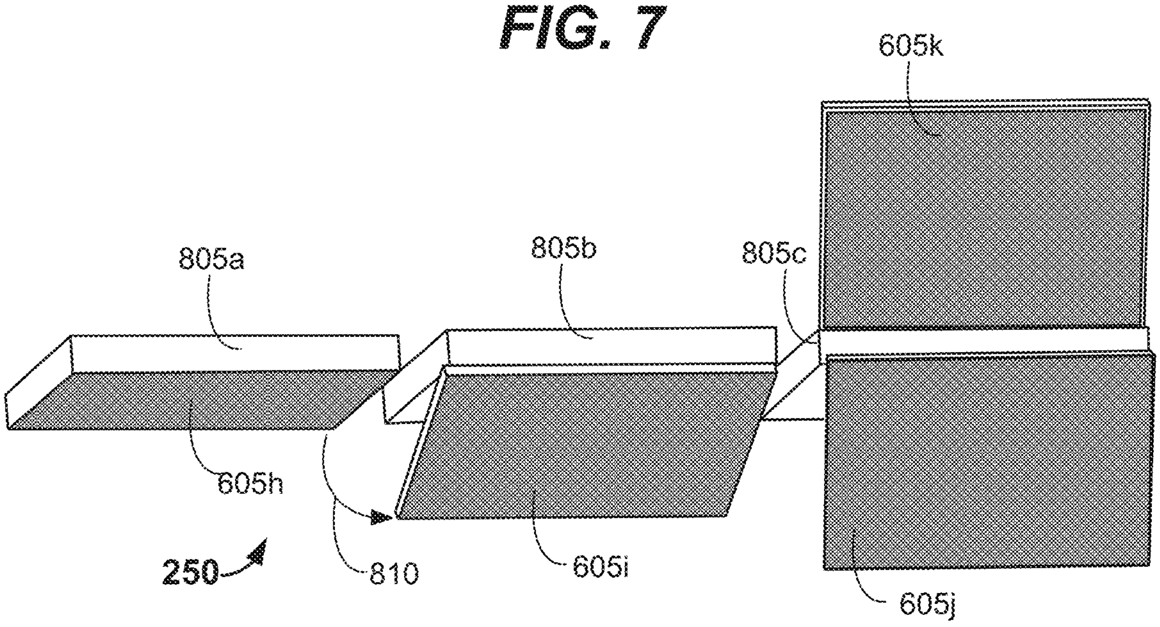

FIGS. 7 and 8 show alternative examples of gaming signage systems having movable displays. In the example shown in FIG. 7, the gaming signage system 250 includes stationary displays 705 and movable displays 605*e*-605*g*. According to this implementation, a motor system of the gaming signage system 250 is configured to raise and lower the movable displays 605*e*-605*g* in a plane behind that of the stationary displays 705, such that the movable displays 605*e*-605*g* are concealed behind the stationary displays 705 when the movable displays 605*e*-605*g* are raised to their highest position. At the moment depicted in FIG. 7, the movable displays 605*e* and 605*f* are shown in a partially lowered position, whereas the movable display 605*g* is shown in a fully lowered position. As with other disclosed implementations, the motor system may be configured to move the movable displays 605*e*-605*g* according to a trigger indication. One or more of the movable displays 605*e*-605*g* may be configured as game feature presentation devices.

In the example shown in FIG. 8, the gaming signage system 250 includes stationary display portions 805*a*-805*c* and movable displays 605*h*-605*k*. According to this implementation, a motor system of the gaming signage system 250 is configured to position the movable displays 605*h*-605*k* by rotating the movable displays 605*h*-605*j* from a horizontal position, as shown by the position of the movable display 605*h*, to a vertical position, as shown by the position of the movable display 605*j*. In this example, the motor system is configured to position at least the movable display 605*k* by rotating the movable display 605*k* from a horizontal position to a vertical position, the latter of which is shown by the position of the movable display 605*k*. In some implementations, the stationary display portions 805*a* and 805*b* may also have movable displays that correspond to the movable display 605*k*. The motor system may be configured to move the movable displays 605*h*-605*k* according to a trigger indication. One or more of the movable displays 605*h*-605*k* may be configured as game feature presentation devices. In some implementations, one or more instances of the movable displays shown in FIG. 7 or FIG. 8, or of a similar movable display, may be used in combination with one or more of the examples that are described above with reference to FIGS. 5-6D.

Figure 9:
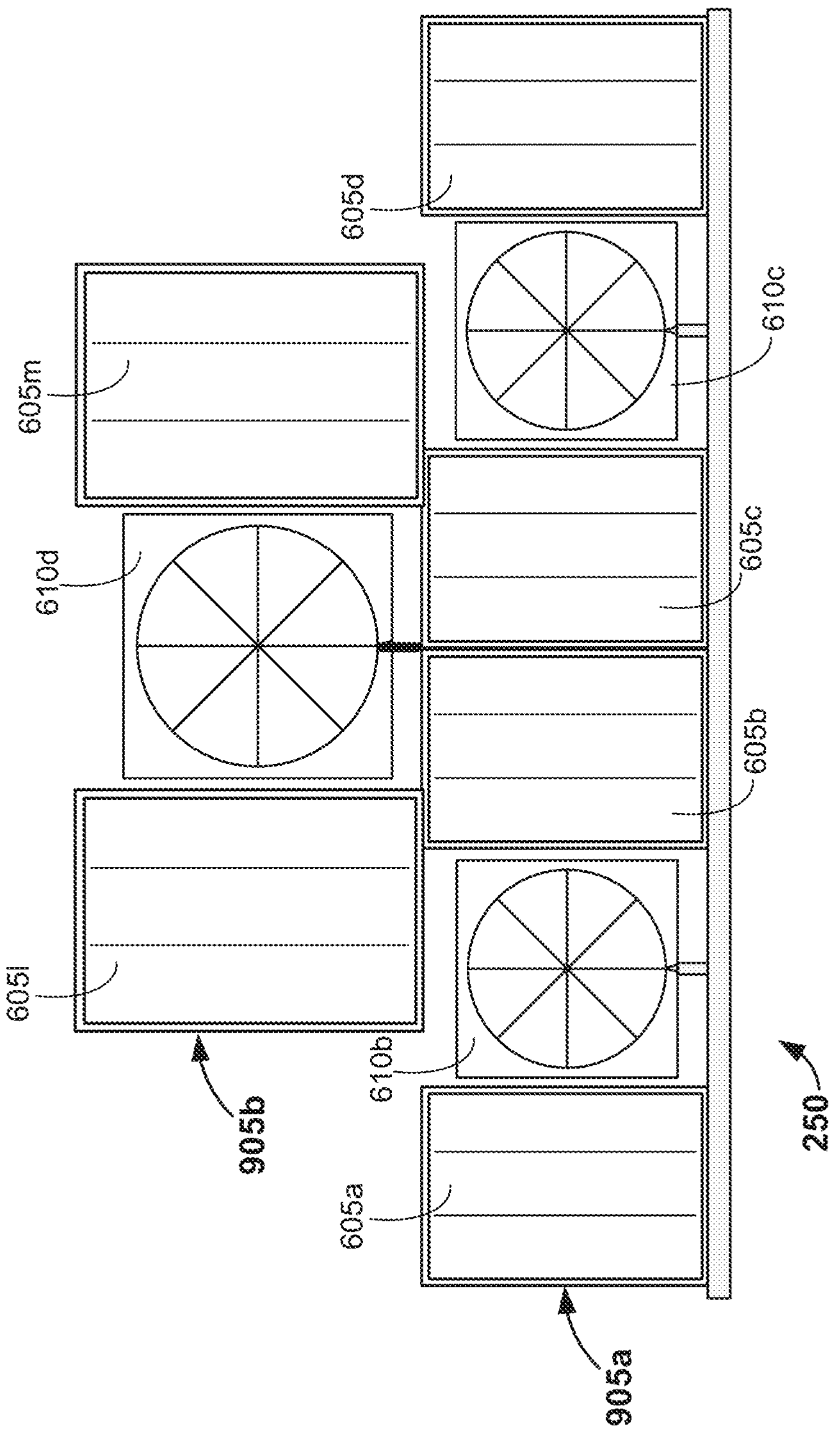
FIG. 9 shows another alternative example of a gaming signage system having movable displays.

FIG. 9 shows another alternative example of a gaming signage system having movable displays. In this example, the gaming signage system 250 includes layers 905*a* and 905*b*. The layer 905*a* may be substantially as described above with reference to FIG. 6D. According to this example, the layer 905*b* includes movable displays 605*l* and 605*m*, as well as game feature presentation device 610*d*. A motor system of the gaming signage system 250 may be configured to move the movable displays 605*l* and 605*m*, as well as the movable displays 605*a*-605*d* according to trigger indications. However, the type of trigger indication that causes the motor system to re-position the movable displays 605*l* and 605*m* may be different from the type of trigger indication that causes the motor system to re-position the movable displays 605*a*-605*d*. For example, the game feature presentation device 610*d* may be used to present a higher-value game feature, as compared to game features that would be presented on the game feature presentation devices 610*a*-610*c*. In some such examples, the game feature presentation devices 610*a*-610*c* may be used to present game features corresponding to a lower-level (e.g., lower potential monetary value) bonus round, whereas the game feature presentation device 610*d* may be used to present game features corresponding to a higher-level (e.g., higher potential monetary value) bonus round.

Positioning the game feature presentation device 610*d* at a relatively higher level than that of the game feature presentation devices 610*a*-610*c* may allow additional casino patrons to view the game features that are presented on the game feature presentation device 610*d*. Moreover, after casino patrons become aware that the game features that are presented on the game feature presentation device 610*d* correspond to significant events, this is likely to create additional excitement in the casino and may attract additional players to play an associated game, such as a type of game that is being presented on one or more EGMs in the vicinity of the gaming signage system.

Figure 10A:
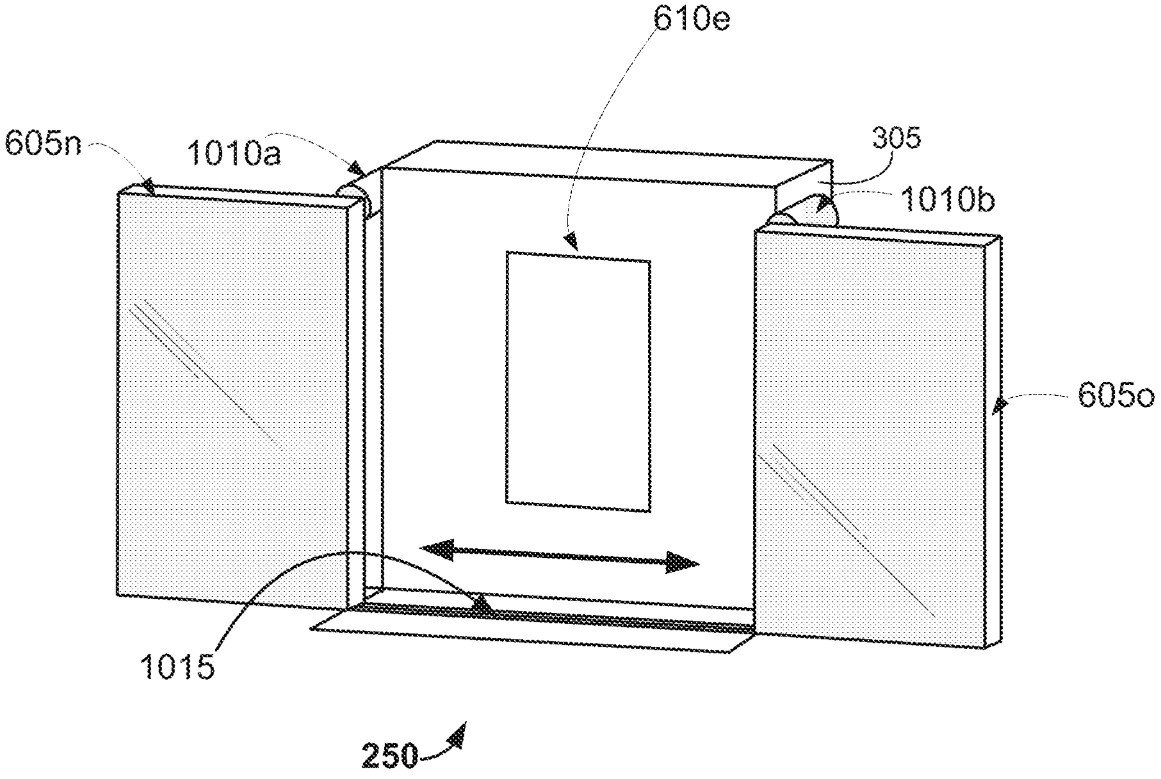
FIGS. 10A-11B show examples of gaming signage systems that may be used to implement at least some of the described above with reference to FIGS. 5-6D and 9.

FIGS. 10A-11B show examples of gaming signage systems that may be used to implement at least some of the examples that are described above with reference to FIGS. 5-6D and 9. FIG. 10A shows an example of a gaming signage system that has caused the movable displays 605*n* and 605*o* to be moved laterally from a first configuration in which the game feature presentation device 610*e* was hidden to a second configuration in which the game feature presentation device 610*e* is revealed. The movable displays 605*n* and 605*o* may be moved from the first configuration to the second configuration in response to a trigger event. Here, the game feature presentation device 610*e* is a stationary display.

When the movable displays 605*n* and 605*o* are in the second configuration, a control system of the gaming signage system 250 may control the movable displays 605*n* and 605*o* to present visual effects that correspond with what is being presented by the game feature presentation device 610*e*. For example, if the game feature presentation device 610*e* is being controlled to present a bonus game, the movable displays 605*n* and 605*o* may present visual effects that correspond with the bonus game. If the game feature presentation device 610*e* is being controlled to indicate that a player has won an award, the movable displays 605*n* and 605*o* may present visual effects that correspond with a celebration of the award.

In this implementation, the movable displays 605*n* and 605*o* can be moved laterally along the track 1015. According to this example, a control system of the gaming signage system 250 is configured to control a motor system to move each of the two movable displays laterally from the first configuration to the second configuration. In this example, the motor system includes the motor assembly 1010*a*, which is configured to position the movable display 605*n*, and the motor assembly 1010*b*, which is configured to position the movable display 605*o*. Here, the motor assemblies 1010*a* and 1010*b* are affixed to the exterior of the gaming signage system's cabinet 305.

Figure 10B:
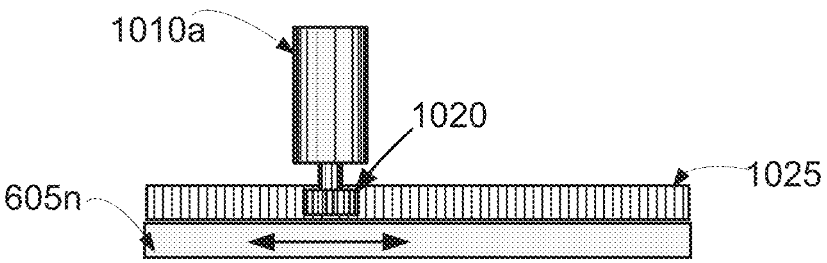

FIG. 10B shows a top view of one of the motor assemblies depicted in FIG. 10A. The motor assembly 1010*a* may, for example, include a stepper motor, a servo motor, a DC motors using pulse width modulation, etc. Alternatively or additionally, the motor assembly 1010*a* may include one or more linear actuators and/or an electromagnetic system. Alternatively or additionally, the motor assembly 1010*a* may include components that are configured to position the movable displays using compressed air or hydraulic fluid. In this example, the motor assembly 1010*a* includes a gear 1020 that is configured to position the movable display 605*n* according to instructions from a control system of the gaming signage system 250. According to this implementation, teeth of the gear 1020 are configured to fit into corresponding teeth of the bracket 1025.

Figure 11A:
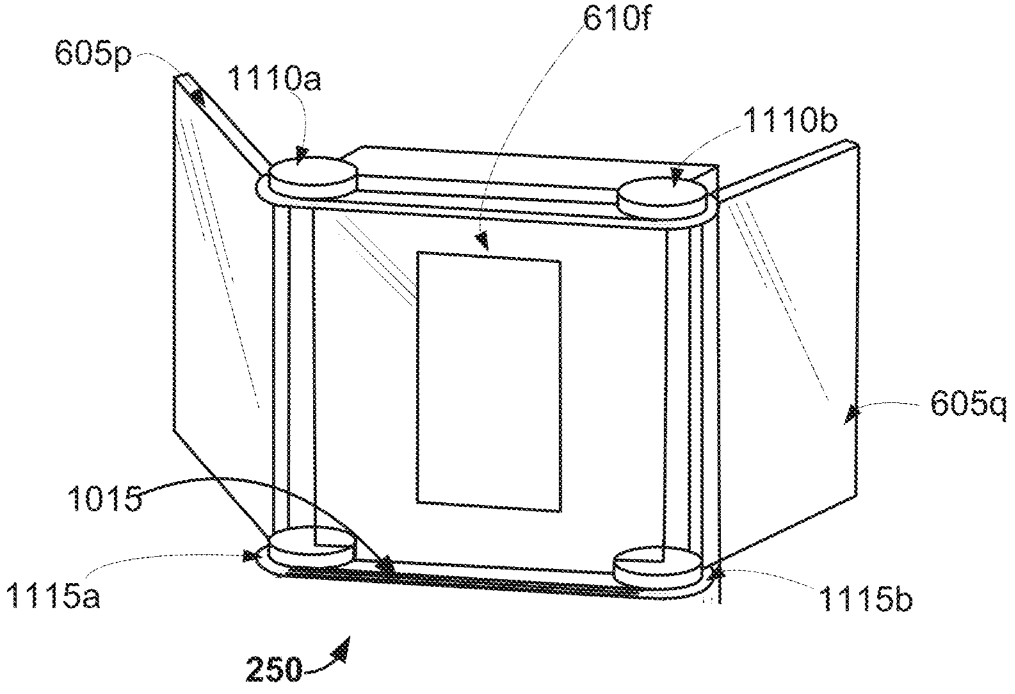
Figure 11B:
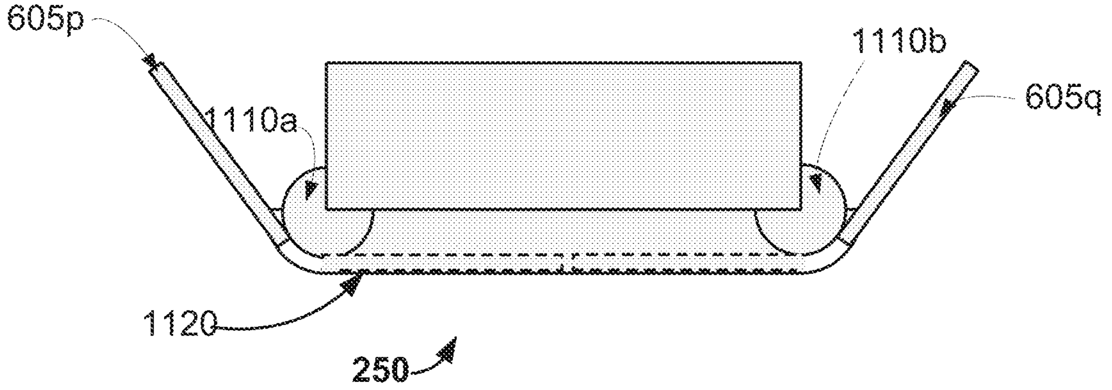

FIGS. 11A and 11B show alternative examples of positioning movable displays. FIGS. 11A and 11B show the movable displays 605*p* and 605*q* in the second configuration, in which the game feature presentation device 610*f* is revealed. FIG. 11B is a top view of the gaming signage system 250 that includes dashed lines 1120 indicating the positions of the movable displays 605*p* and 605*q* when they are in the first configuration, in which the game feature presentation device 610*f* is hidden.

According to these examples, the motor assemblies 1110*a* and 1110*b* are configured to both slide and rotate the movable displays 605*p* and 605*q* as they are moved from the first configuration to the second configuration. When the motor assemblies 1110*a* and 1110*b* begin to move the movable displays 605*p* and 605*q* from the first configuration, the motor assemblies 1110*a* and 1110*b* slide the movable displays 605*p* and 605*q* laterally along the track 1015.

After the motor assemblies 1110*a* and 1110*b* have moved the movable displays 605*p* and 605*q* beyond the track 1015, the motor assemblies 1110*a* and 1110*b* rotate the movable displays 605*p* and 605*q* into the second configuration. In this example, a bottom edge of the movable display 605*p* is supported by the flange 1115*a* and a bottom edge of the movable display 605*q* is supported by the flange 1115*b*.

According to some alternative implementations, the motor assemblies 1110*a* and 1110*b* rotate the movable displays 605*p* and 605*q* from the first configuration to the second configuration. In some such implementations, the motor assemblies 1110*a* and 1110*b* rotate the movable displays 605*p* and 605*q* from the first configuration to the second configuration without sliding the movable display 605*p* or the movable display 605*q*.

Figure 12A:
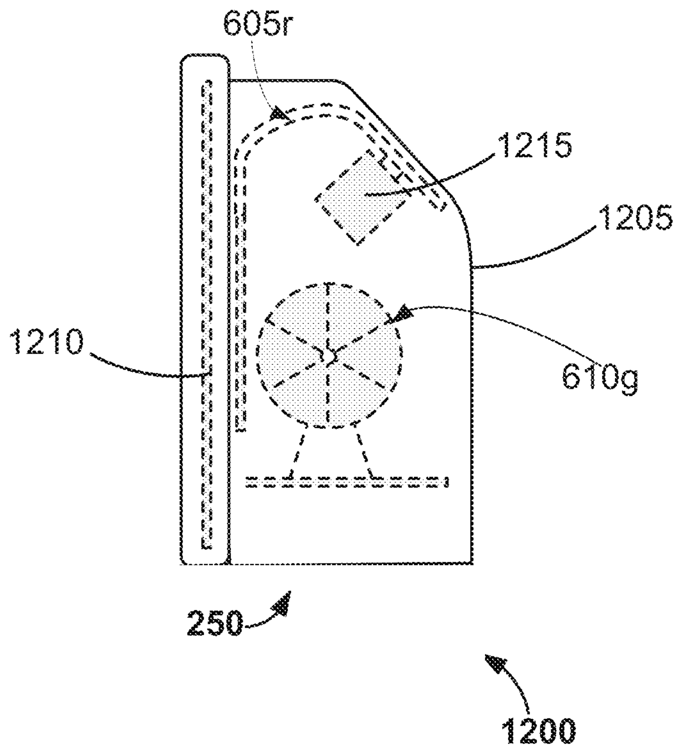
FIGS. 12A and 12B show examples of positioning a flexible display within a cabinet of a gaming signage system.
Figure 12B:
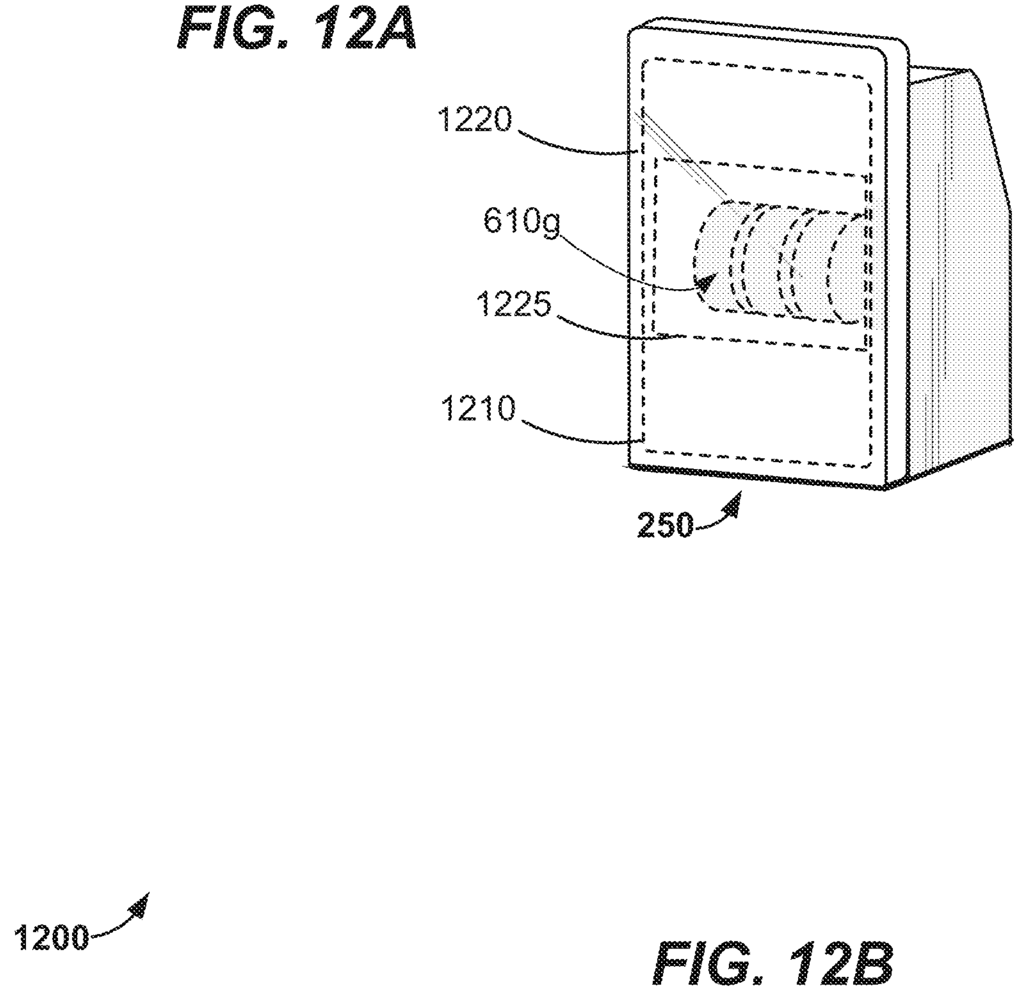

FIGS. 12A and 12B show examples of positioning a flexible display within a cabinet of a gaming signage system. Accordingly, FIGS. 12A and 12B show additional examples of devices that may be used to implement at least some of the examples that are described above with reference to FIGS. 5-6D and 9. FIG. 12A shows the movable display 605*r* in a first configuration, in which the movable display 605*r* conceals a game feature presentation device 610*g*. The movable display 605*r* may, for example, include a flexible organic light emitting diode (OLED) display. In the examples shown in FIGS. 12A and 12B, a rigid and transparent front panel 1210 resides within the gaming signage system 250. The motor assembly 1215 is configured to position the flexible display 605*r* in a desired configuration, according to commands from a control system of the gaming signage system 250.

FIG. 12B shows the gaming signage system 250 when the flexible display 605*r* is in a second configuration in which the game feature presentation device 410 is visible from the exterior of the gaming signage system 250. According to this example, the game feature presentation device 610*g* includes a plurality of mechanical reels that may be used to present a slot bonus game. In some implementations, a bonus game may be presented on the flexible display 605*r* when the flexible display 605*r* is in the "second configuration" described above with reference to block 515 of FIG. 5. In alternative implementations, the game feature presentation device 610*g* may be, or may include, a stationary display. In the example shown in FIG. 12B, the area of the front panel 1210, represents the viewable area of the main display 1220 when the movable display 605*r* is in the first configuration. When the movable display 605*r* is in the second configuration, the game feature presentation device 410 may be viewed through the window 1225.

Figure 13A:
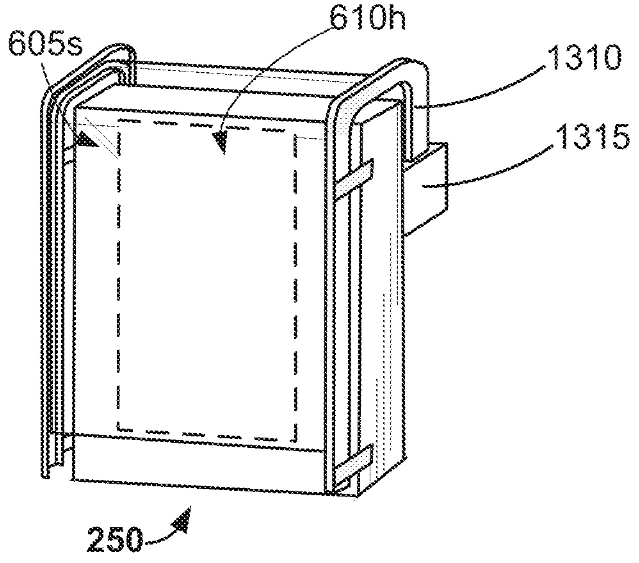
FIGS. 13A and 13B show examples of positioning a flexible display outside a cabinet of a gaming signage system.
Figure 13B:
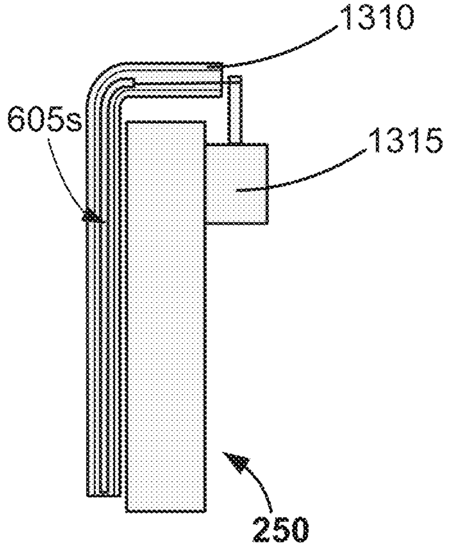

FIGS. 13A and 13B show examples of positioning a flexible display outside a cabinet of a gaming signage system. Accordingly, FIGS. 13A and 13B show additional examples of devices that may be used to implement at least some of the examples that are described above with reference to FIGS. 5-6D and 9. The movable display 605*s* may, for example, include a flexible OLED display. Both FIG. 13A and FIG. 13B show the movable display 605*s* in a first configuration in which the game feature presentation device 610*h* is hidden from view. In this example, the game feature presentation device 610*h* is a stationary display.

However, the motor assembly 1315 is configured to move the movable display 605*s* to other positions, according to instructions from a control system of the gaming signage system 250. According to these examples, the motor assembly 1315 is configured to move the movable display 605*s* along the rails 1310. The side cross-sectional view of FIG. 13B more clearly shows the movable display 605*s* positioned inside of the rails 1310. In these examples, the gaming signage system 250 is configured to move the movable display 605*s* to a second configuration in which at least part of the game feature presentation device 610*h* is visible.

Figure 14:
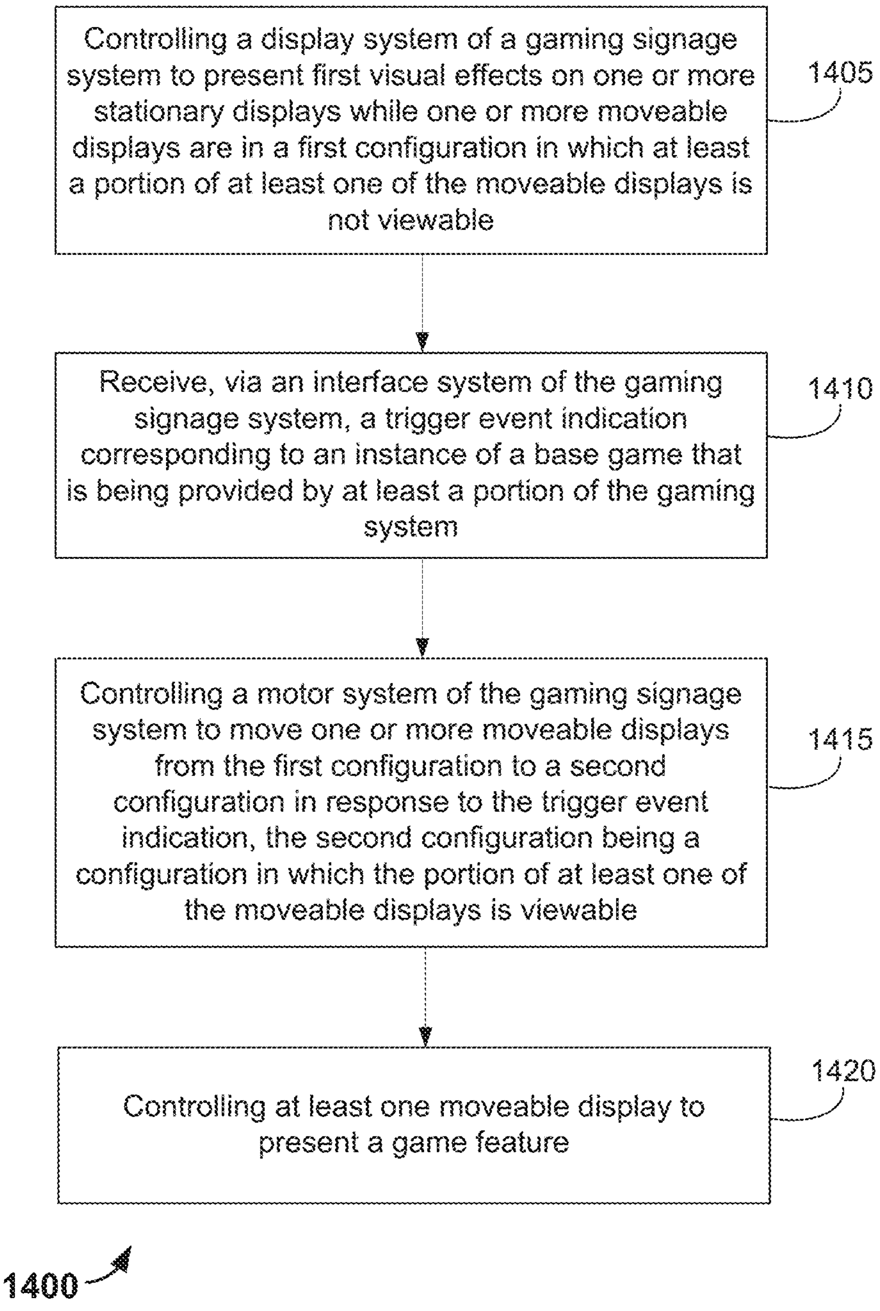
FIG. 14 is a flow diagram that shows blocks of an alternative method according to one example.

FIG. 14 is a flow diagram that shows blocks of an alternative method according to one example. Method 1400 may be performed, at least in part, by a control system of a gaming signage system. The control system may include one or more processors and may be, or may include, an instance of the control system 420 that is described above with reference to FIG. 4. In some implementations the control system may include one or more non-transitory storage media operatively coupled to the one or more processors. In some examples, the method 1400 may be performed by a gaming signage system according to software stored upon one or more non-transitory storage media.

According to this example, block 1405 involves controlling the display system of a gaming signage system to present first visual effects on one or more of one or more stationary displays while the one or more movable displays are in a first configuration. When in the first configuration, at least a portion of at least one of the movable displays is not viewable. For example, the one or more movable displays may not be viewable because the movable displays are concealed within a cabinet of the gaming signage system when in the first configuration. In alternative implementations, the movable displays may be concealed behind, beneath or above a cabinet of the gaming signage system when in the first configuration.

In this example, block 1410 involves receiving, via an interface system of a gaming signage system that is configured for communication with a gaming system, a trigger event indication corresponding to an instance of a base game that is being provided by at least a portion of the gaming system. In some examples, the trigger event indication corresponds to an event of the base game, such as a predetermined combination of symbols. According to some examples, the trigger event indication may correspond to a win of the base game. Alternatively, or additionally, the trigger event indication may correspond to the award of one or more bonus games, which may or may not be instances of the base game. However, in some alternative implementations the trigger event indication may be unrelated to an event of the base game.

According to some examples the trigger event indication may be determined by a random number generator (such as the RNG 212 that is described above with reference to FIG. 2) that is implemented by the control system of an gaming signage system. However, in some examples block 1410 may involve a determination made by a device other than the EGM that is presenting the base game. In some implementations determining a trigger event may involve receiving, via a network interface system of a gaming signage system, data corresponding to the trigger event. Such data may, for example, be received from a game server or a progressive system server.

In this example shown in FIG. 14, block 1415 involves controlling a motor system of the gaming signage system to move one or more movable displays from the first configuration to a second configuration in response to the trigger event indication. In this example, the second configuration is a configuration in which the portion of at least one of the movable displays is viewable. The motor system may include one or more electric motors that are configured to position the movable display(s).

According to this example, block 1420 involves presenting a game feature on one or more of the movable displays that were revealed in block 1415. The game feature may vary according to the particular implementation. In some examples, the game feature may include visual effects corresponding to a bonus game, visual effects corresponding to an aspect of the base game that was not previously being presented on an EGM and/or visual effects corresponding to a presentation of a celebration.

Figure 15A:
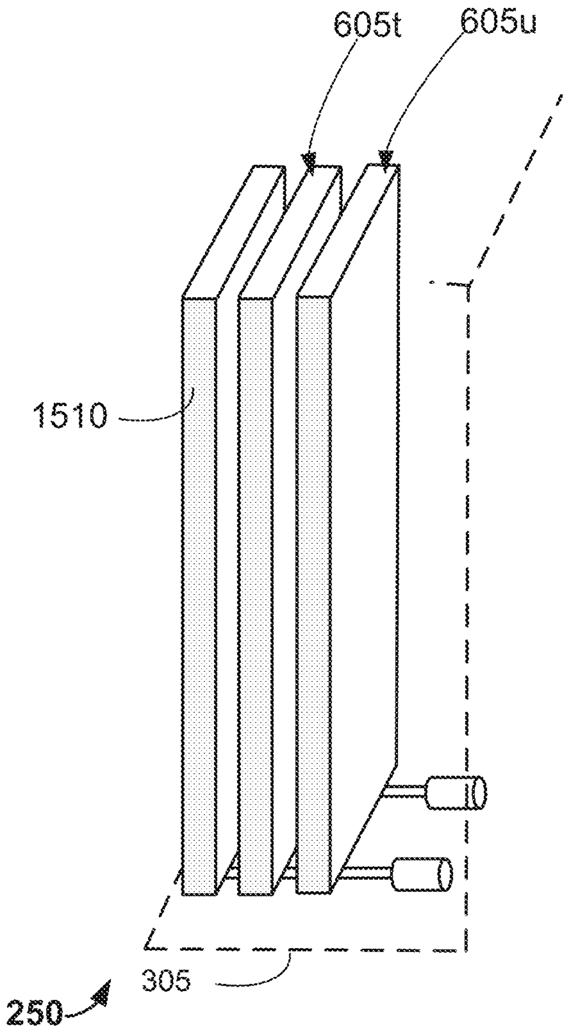
FIGS. 15A and 15B show examples of a gaming signage system that can be configured to perform the method of FIG. 14.
Figure 15B:
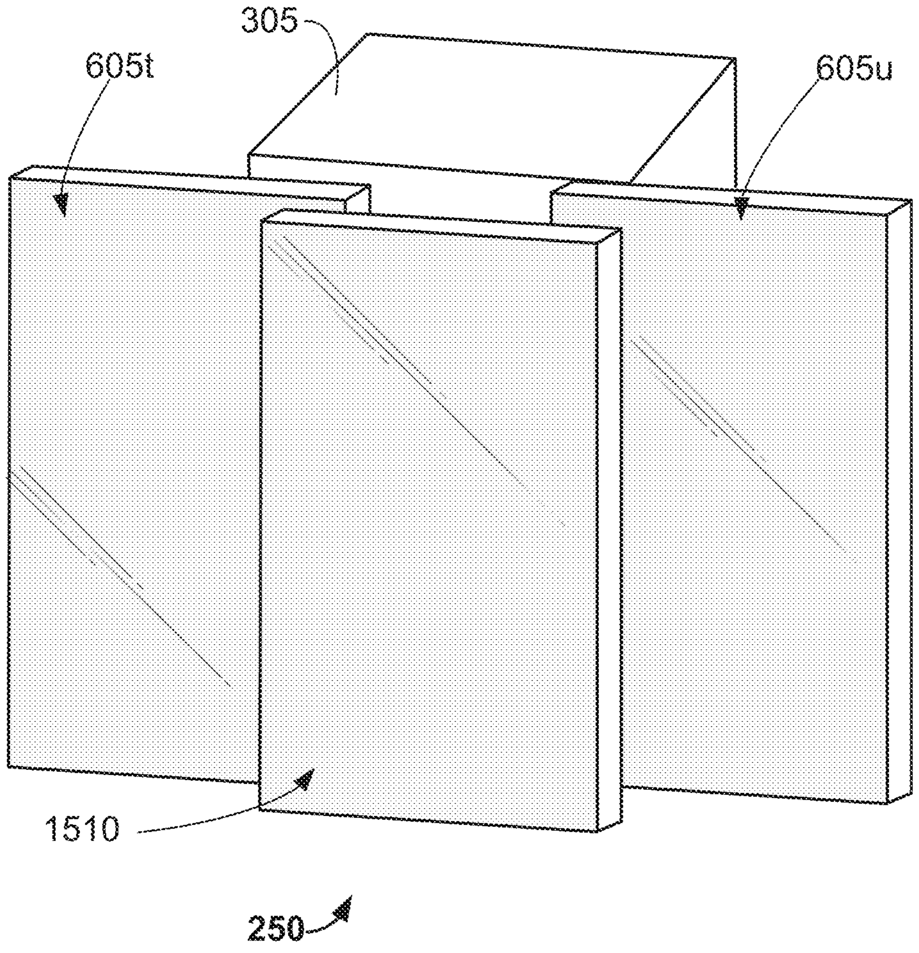

FIGS. 15A and 15B show examples of a gaming signage system that can be configured to perform the method of FIG. 14. FIG. 15A is a side view of the gaming signage system 250, with part of the cabinet 305 shown as dashed lines. In this example, the display 1510 is a stationary display and the displays 605*t* and 605*u* are movable displays. In alternative implementations, the display 1510 may also be a movable display. FIG. 15A shows the gaming signage system 250 in a first configuration in which the movable displays 605*t* and 605*u* are concealed within the cabinet 305. The gaming signage system 1500 may, for example present a base game on the display 1510 while the movable displays 605*t* and 605*u* are in the first configuration.

FIG. 15B shows a perspective view of the gaming signage system 1500 when the movable displays 605*t* and 605*u* are in a second configuration: here, both of the movable displays 605*t* and 605*u* are viewable from outside of the cabinet 305 when the movable displays 605*t* and 605*u* are in the second configuration. According to some examples, game features may be presented on one or more of the movable displays 605*t* and 605*u* while the movable displays 605*t* and 605*u* are in the second configuration. The game features may vary according to the particular implementation. In some examples, the game features may include visual effects corresponding to a bonus game that is being presented on movable displays 605*t* and 605*u*. For example, the game features may include graphics corresponding to an award of the bonus game, such as visual effects corresponding to a presentation of a celebration. In some alternative examples, the game features presented on movable displays 605*t* and 605*u* may include visual effects corresponding to a bonus game that is being presented on the display 1510. In other examples, the game features may include graphics corresponding to a theme of the game that is being presented on the gaming signage system 1500. For example, if the game has a pirate theme, the game features may include graphics corresponding to piracy, such as a battle scene depicting pirates taking over a ship, a depiction of finding treasure, etc. In some examples, the graphics may only be presented when the gaming signage system 1500 is in the second configuration.

Figure 16:
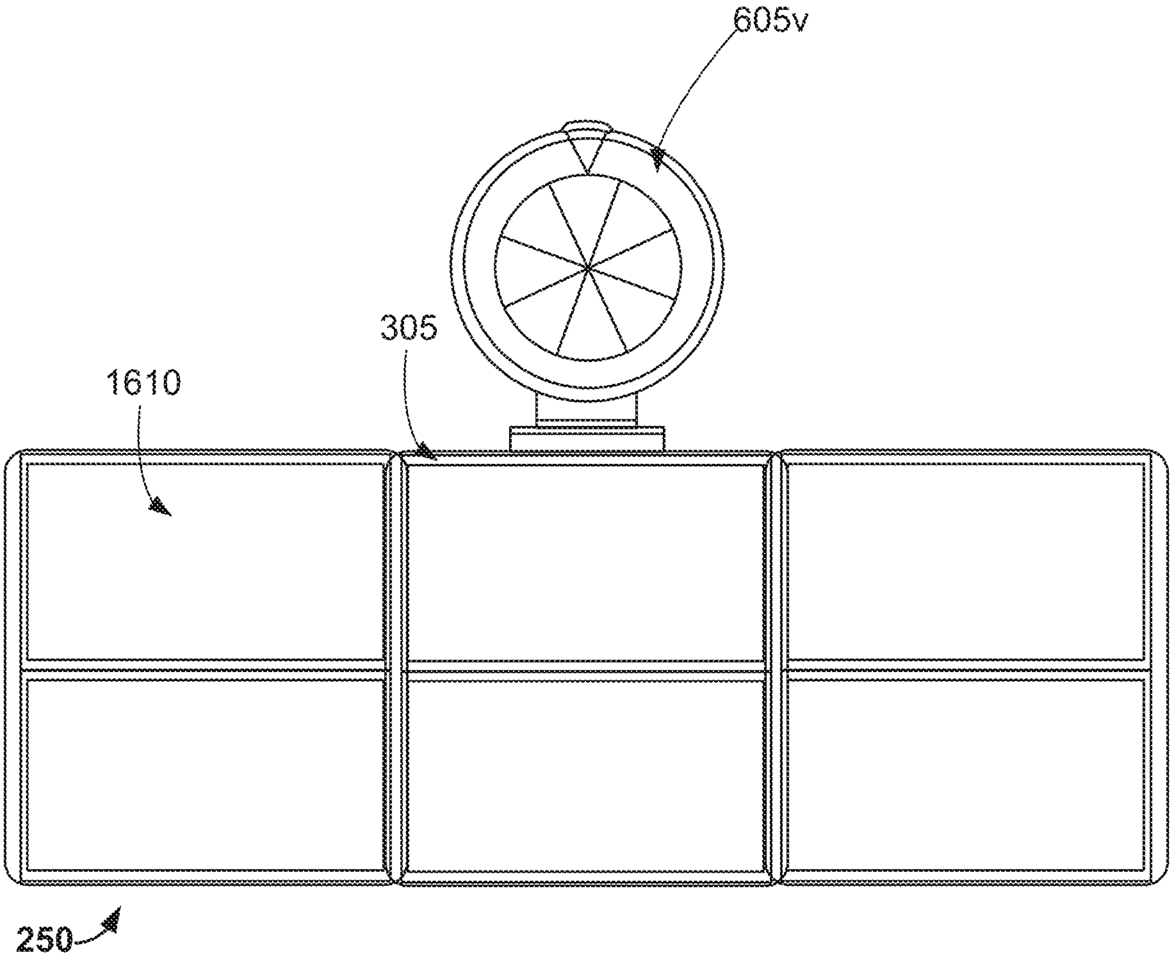
FIG. 16 shows another example of a gaming signage system that can be configured to perform the method of FIG. 14.

FIG. 16 shows another example of a gaming signage system that can be configured to perform the method of FIG. 14. In this example, the displays 1610 are stationary displays and the display 605*v* is a movable display. Some alternative implementations may include more than one instance of the movable display 605*v*. In other alternative implementations, one or more of the displays 1510 may also be movable displays. FIG. 16 shows the gaming signage system 250 in the second configuration referenced in FIG. 14, in which at least one movable display is viewable. When in a first configuration the movable display 605*v* is concealed, at least partially, behind the cabinet 305.

According to some examples, game features may be presented on the movable display 605*v* when the movable display 605*v* is in the second configuration. The game features may vary according to the particular implementation. In some examples, the game features may include visual effects corresponding to a bonus game that is being presented on the movable display 605*v*. For example, the game features may include graphics corresponding to an award of the bonus game, such as visual effects corresponding to a presentation of a celebration. In some alternative examples, the game features presented on the movable display 605*v* may include visual effects corresponding to a bonus game that is being presented on the displays 1610. In some implementations, one or more instances of the movable display 605*v*, or of a similar movable display, may be used in combination with one or more of the examples that are described above with reference to FIGS. 5-6D and 9. According to some implementations, one or more instances of the movable display 605*v*, or of a similar movable display, may be used in combination with one or more of the examples that are described above with reference to FIGS. 10A-13B, 15A or 15B.

Figure 17:
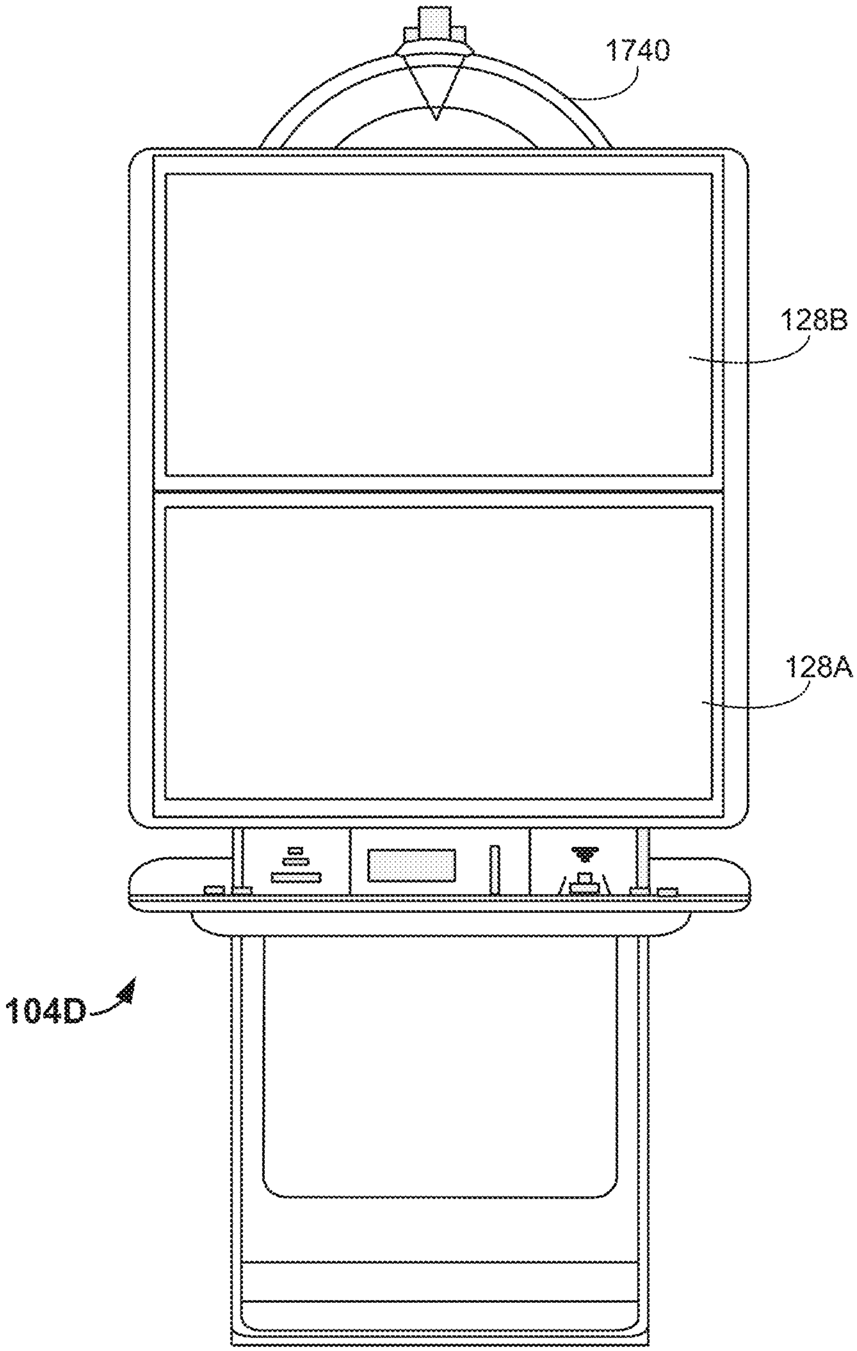
FIGS. 17-20 show examples of EGMs that include movable displays.
Figure 18:
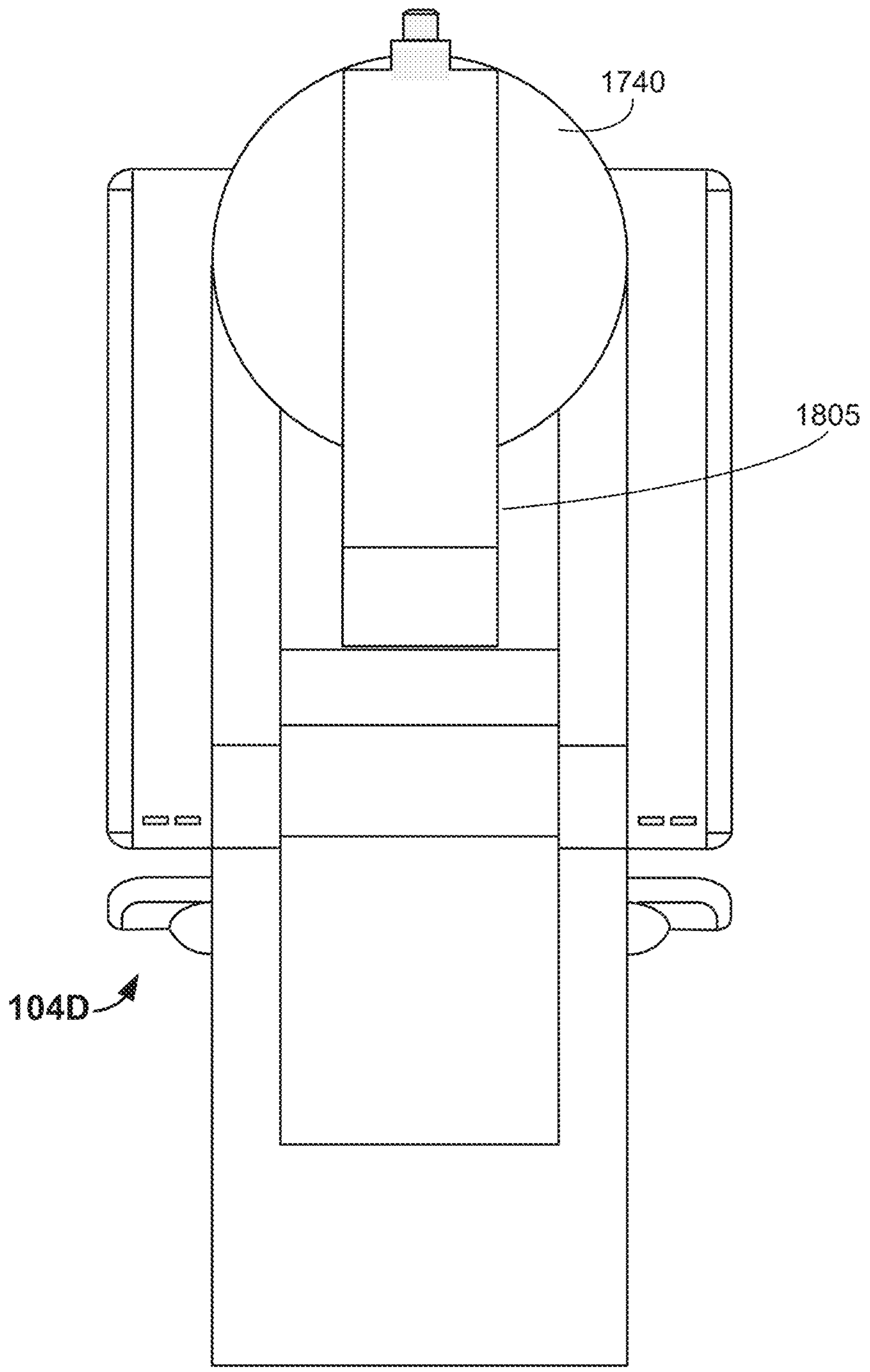

FIGS. 17-20 show examples of EGMs that include movable displays. According to this implementation, the EGM 104D includes stationary displays 128A and 128B, as well as the movable display 1740. In this example, the movable display 1740 is a movable topper display. FIG. 17 shows a front view of the EGM 104D in a first configuration, in which the movable display 1740 is in a first configuration. In this example, when the movable display 1740 is in the first configuration, the movable display 1740 is at least partially concealed behind the EGM 104D. FIG. 18 shows a back view of the EGM 104D in the first configuration.

Figure 19:
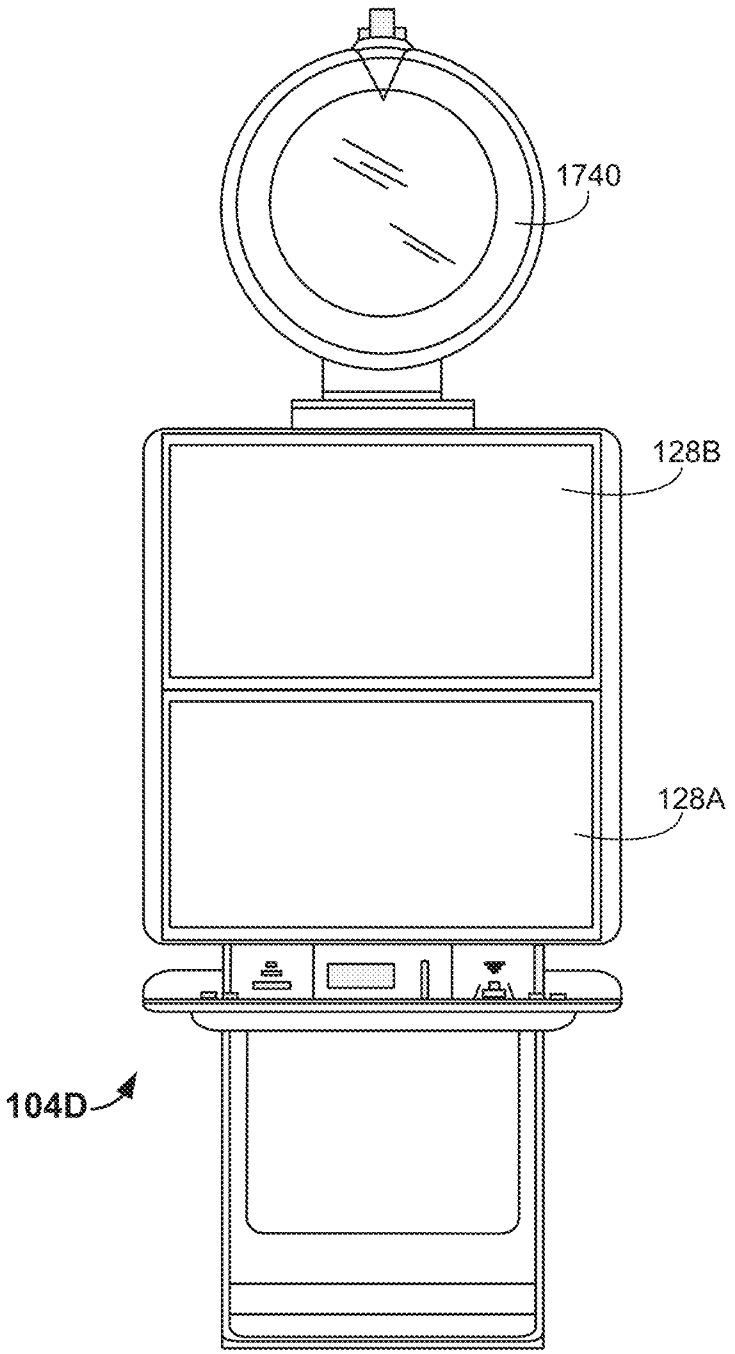
Figure 20:
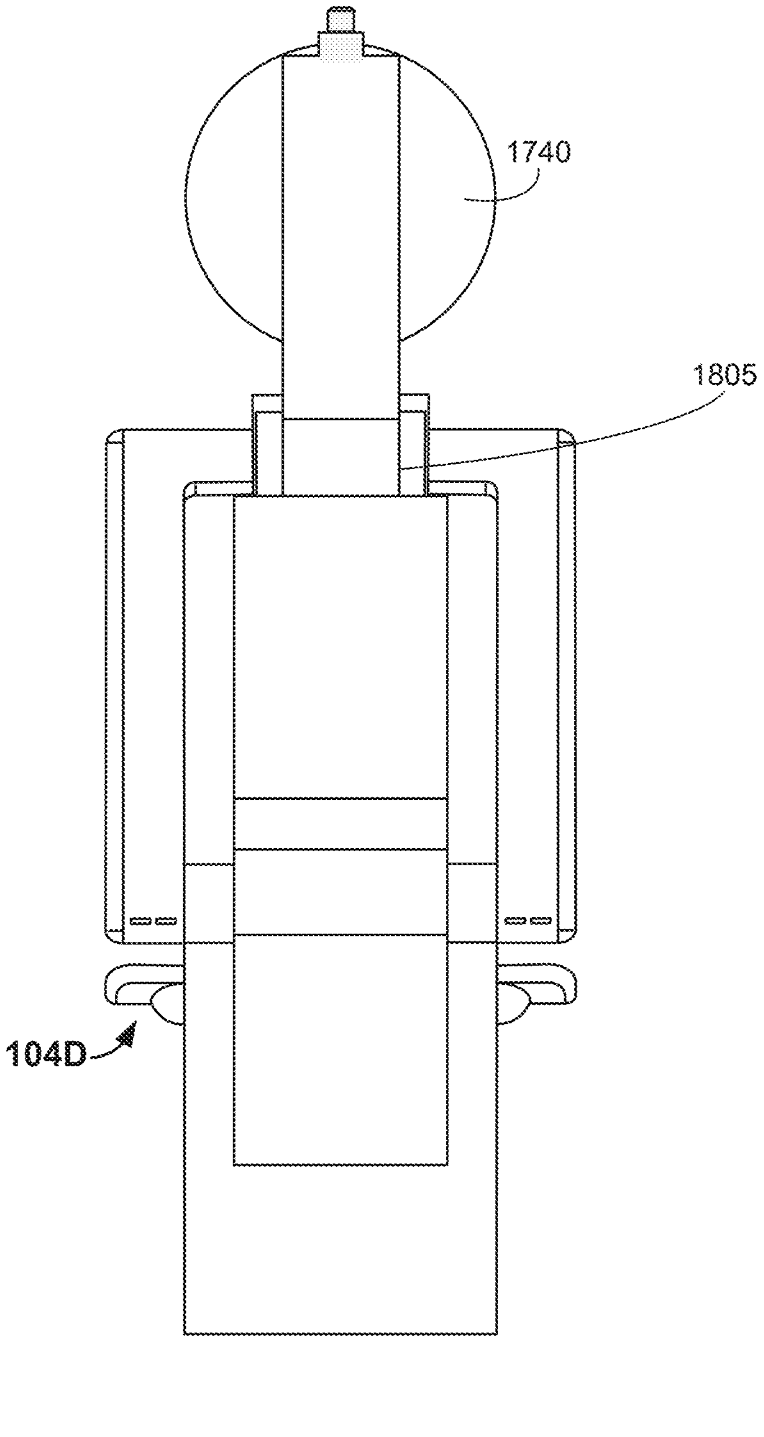

FIG. 19 shows a front view of the EGM 104D in a second configuration, in which the movable display 1740 is positioned above the stationary display 128B and is fully revealed. In some examples, the movable display 1740 may be moved by a motor system of the EGM 104D from the first configuration to the second configuration in response to a trigger indication determined by a control system of the EGM 104D. The trigger indication may, for example, correspond to an event of an instance of a game that is being presented on the EGM 104D. For example, the movable display 1740 may be used to present one or more bonus games in response to the trigger indication. FIG. 20 shows a back view of the EGM 104D in the second configuration.

While the invention has been described with respect to the figures, it will be appreciated that many modifications and changes may be made by those skilled in the art without departing from the spirit of the invention. Any variation and derivation from the above description and figures are included in the scope of the present invention as defined by the claims.

The invention claimed is:

1. A gaming system, comprising:

a gaming display system including a stationary gaming display and a movable gaming display, the movable gaming display having a single display housing and a display area for displaying visual effects;

a gaming display motor system comprising one or more motors that are configured to position the movable gaming display; and a gaming control system including one or more processors, the gaming control system being configured for:

controlling the gaming display motor system to position the movable gaming display in a first configuration in which at least a first portion of the display area of the movable gaming display is not viewable and at least a second portion of the display area of the movable gaming display is concurrently viewable;

determining a trigger event indication;

controlling the gaming display motor system to move the movable gaming display from the first configuration to a second configuration in response to the trigger event indication, the second configuration being a configuration in which both the first portion of the display area and the second portion of the display area of movable gaming display are viewable; and presenting, while the movable gaming display is in the second configuration, a game feature on at least the first portion of the display area of the movable gaming display.

2. The gaming system of claim 1, wherein the trigger event indication corresponds to an instance of a base game that is being provided by at least the gaming display system.

3. The gaming system of claim 2, wherein the instance of the base game is presented on at least the stationary gaming display.

4. The gaming system of claim 1, wherein the trigger event indication corresponds to an occurrence in a game that is being presented on a nearby gaming machine.

5. The gaming system of claim 1, wherein the presenting the game feature further includes presenting the game feature on both the first portion and the second portion of the display area.

6. The gaming system of claim 1, wherein the presenting the game feature further includes presenting the game feature on the stationary gaming display and the first portion of the display area of the movable gaming display.

7. The gaming system of claim 1, wherein in the second configuration, the first portion of the display area of the movable gaming display and the second portion of the display area of the movable gaming display are above the stationary gaming display.

8. The gaming system of claim 1, wherein:

the gaming display system is in a bank of electronic gaming machines, and in the second configuration, tops of the electronic gaming machines in the bank of electronic gaming machines are below a top of the movable gaming display.

9. The gaming system of claim 1, wherein the trigger event indication corresponds to an initiation of one or more bonus games.

10. The gaming system of claim 1, wherein the game feature is only presented when the gaming display system is in the second configuration.

11. A method of controlling a gaming system, the method comprising:

controlling, via a gaming control system that includes one or more processors, a gaming display motor system that includes one or more motors configured to position a movable gaming display of a gaming display system that includes a stationary gaming display and the movable gaming display, the movable gaming display having a single display housing and a display area for displaying visual effects, to position the movable gaming display in a first configuration in which at least a first portion of the display area of the movable gaming display is not viewable and at least a second portion of the display area of the movable gaming display is concurrently viewable;

determining, via the gaming control system, a trigger event indication;

controlling, via the gaming control system, the gaming display motor system to move the movable gaming display from the first configuration to a second configuration in response to the trigger event indication, the second configuration being a configuration in which both the first portion of the display area and the second portion of the display area of the movable gaming display are viewable; and presenting, via the gaming control system and while the movable gaming display is in the second configuration, a game feature on at least the first portion of the display area of the movable gaming display.

12. The method of claim 11, wherein the trigger event indication corresponds to an instance of a base game that is being provided by at least the gaming display system.

13. The method of claim 12, wherein the instance of the base game is presented on at least the stationary gaming display.

14. The method of claim 11, wherein the trigger event indication corresponds to an occurrence in a game that is being presented on a nearby gaming machine.

15. The method of claim 11, wherein the presenting the game feature further includes presenting the game feature on both the first portion and the second portion of the display area.

16. The method of claim 11, wherein the presenting the game feature further includes presenting the game feature on the stationary gaming display and the first portion of the display area of the movable gaming display.

17. The method of claim 11, wherein in the second configuration, the first portion of the display area of the movable gaming display and the second portion of the display area of the movable gaming display are above the stationary gaming display.

18. One or more non-transitory media having software stored thereon, the software including instructions for performing a method of controlling a gaming system, the method comprising:

controlling, via a gaming control system that includes one or more processors, a gaming display motor system that includes one or more motors configured to position a movable gaming display of a gaming display system that includes a stationary gaming display and the movable gaming display, the movable gaming display having a single display housing and a display area for displaying visual effects, to position the movable gaming display in a first configuration in which at least a first portion of the display area of the movable gaming display is not viewable and at least a second portion of the display area of the movable gaming display is concurrently viewable;

determining, via the gaming control system, a trigger event indication;

controlling, via the gaming control system, the gaming display motor system to move the movable gaming display from the first configuration to a second configuration in response to the trigger event indication, the second configuration being a configuration in which both the first portion of the display area and the second portion of the display area of the movable gaming display are viewable; and presenting, via the gaming control system and while the movable gaming display is in the second configuration, a game feature on at least the first portion of the display area of the movable gaming display.

19. The one or more non-transitory media of claim 18, wherein the trigger event indication corresponds to an instance of a base game that is being provided by at least the gaming display system.

20. The one or more non-transitory media of claim 18, wherein the trigger event indication corresponds to an occurrence in a game that is being presented on a nearby gaming machine.

* * * * *